(12) United States Patent
Umakoshi et al.

(10) Patent No.: US 8,292,784 B2
(45) Date of Patent: Oct. 23, 2012

(54) VEHICLE CONTROL DEVICE

(75) Inventors: Motoaki Umakoshi, Oobu (JP); Shotaro Fukuda, Oobu (JP); Hajime Kumabe, Kariya (JP); Masayoshi Takeda, Kariya (JP); Yukio Mori, Kariya (JP)

(73) Assignees: DENSO CORPORATION, Kariya (JP); Advics Co., Ltd., Aichi-pref. (JP)

( * ) Notice: Subject to any disclaimer, the term of this patent is extended or adjusted under 35 U.S.C. 154(b) by 758 days.

(21) Appl. No.: 12/458,485

(22) Filed: Jul. 14, 2009

(65) Prior Publication Data

US 2010/0009807 A1    Jan. 14, 2010

(30) Foreign Application Priority Data

Jul. 14, 2008   (JP) .................. 2008-182804

(51) Int. Cl.
| F16D 48/06 | (2006.01) |
| B60W 10/04 | (2006.01) |
| G06F 7/00 | (2006.01) |
| B60T 7/12 | (2006.01) |
| B60T 8/60 | (2006.01) |
| B60K 31/00 | (2006.01) |
| B60K 31/18 | (2006.01) |
| B60K 31/04 | (2006.01) |

(52) U.S. Cl. ............ 477/73; 477/109; 477/115; 701/36; 701/54; 701/70; 701/79; 701/96; 303/155; 180/170; 180/171; 180/179

(58) Field of Classification Search .................. 477/73, 477/109, 115; 701/36, 54, 70, 79, 93–96, 701/110; 303/155; 180/170–179
See application file for complete search history.

(56) References Cited

FOREIGN PATENT DOCUMENTS
| JP | A-H07-081463 | 3/1995 |
| JP | A-2006-506270 | 9/2006 |

*Primary Examiner* — James Trammell
*Assistant Examiner* — Majdi Alsomiri
(74) *Attorney, Agent, or Firm* — Posz Law Group, PLC

(57) ABSTRACT

In a vehicle control device, a brake feedback control unit calculates a brake feedback torque $T_{fb\text{-}BK}$ using a PID control model when a current state is a brake feedback use state. The brake feedback control unit stops the calculation of the brake feedback torque $T_{fb\text{-}BK}$ when the current state is a brake feedback limitation state, and stores as an output value the brake feedback torque $T_{fb\text{-}BK}$ that is output at a brake limitation start timing. At a brake limitation release timing, the brake feedback control unit restarts the feedback control using the stored brake feedback torque $T_{fb\text{-}BK}$ as an initial value. The brake mechanism can thereby generate a predetermined brake torque of not more than 0 [N·m] immediately after the brake limitation release timing.

10 Claims, 11 Drawing Sheets

VEHICLE CONTROL DEVICE

CROSS-REFERENCE TO RELATED APPLICATION

This application is related to and claims priority from Japanese Patent Application No. 2008-182804 filed on Jul. 14, 2008, the contents of which are hereby incorporated by reference.

BACKGROUND OF THE INVENTION

1. Field of the invention

The present invention relates to a vehicle control device mounted to a vehicle for controlling a vehicle acceleration so that an actual acceleration (or a current acceleration) of the vehicle becomes equal to a target acceleration requested in response to a running state of the vehicle.

2. Description of the Related Art

There have been known various types of driver support systems for cruise control and adaptive cruise control. The cruise control keeps a vehicle speed at a set speed (or a target speed). The adaptive cruise control keeps a distance between a driver's vehicle and a front running vehicle at a predetermined vehicle distance (or a target vehicle distance) that is set in advance and changeable. Such a type of the driver support system is comprised of a power train control device and a hydraulic (or oil pressure) brake control device.

The power train control device generates a power train control value and controls a power train mechanism comprised of an internal combustion engine and a transmission to generate a drive torque or a brake torque in proportion to the magnitude indicated by the power train control value.

The hydraulic brake control device generates a brake control value and controls a hydraulic (or oil pressure) brake mechanism to generate a brake torque in proportion to the magnitude designated by the brake control value.

The driver support system further comprises a vehicle control device for executing following control processes (a) and (b):

(a) a process of calculating a target vehicle acceleration, that is required to obtain a target vehicle speed or to keep a target vehicle distance, in response to a running state of the vehicle (hereinafter, referred to as the "target acceleration calculation process"); and (b) a process of calculating a power train control value and a brake control value so that the target vehicle acceleration calculated by the target acceleration calculation process (a) becomes equal to an actual acceleration applied to the vehicle, and of outputting the power train control value and the brake control value to the power train control device and the hydraulic brake control device.

Japanese patent documents, for example, Japanese unexamined patent laid open publication "Kohyo" No. JP 2006-506270, and Japanese patent laid open publication No. JP H07-81463 have disclosed such a vehicle control device.

When the target acceleration is a positive acceleration to increase the driver's vehicle speed, the vehicle control device of such a type calculates a power train control value so that the actual acceleration of the driver's vehicle reaches the target acceleration, and then outputs the calculated power train control value to the power train control device in order to generate a drive torque by the power train mechanism.

On the other hand, when the target acceleration is a negative acceleration (hereinafter, referred to as a "target deceleration") to decrease the vehicle speed, the vehicle control device firstly calculates a power train control value so that an actual deceleration speed of the vehicle becomes equal to the target deceleration speed, and then outputs the calculated power train control value to the power train control device in order to generate a brake torque by the power train mechanism.

In particular, when the target deceleration speed can be achieved only by using the brake torque generated by the power train mechanism, the vehicle control device repeatedly calculates and outputs the power train control values to the power train control device in order to generate the brake torques by the power train mechanism (hereinafter, referred to as the "brake limitation control", namely, the "engine braking control").

On the other hand, when the target deceleration speed cannot be achieved only by using the brake torque generated by the power train mechanism, the vehicle control device outputs the brake control value to the hydraulic brake control device in order to generate an additional brake torque by the hydraulic brake mechanism, in addition to outputs the power train control value to the power train control device in order to generate the brake torque by the power train mechanism (hereinafter, referred to as the "brake use control").

That is, when the target acceleration calculated by the target acceleration calculation process is a deceleration (as a negative value), and when the magnitude of the brake torque to be generated by the power train mechanism (hereinafter, referred to as an "output request brake torque") is smaller than the maximum brake torque to be generated by the power train mechanism, the vehicle control device controls only the power train mechanism to generate the brake torque without using the hydraulic brake mechanism.

On the other hand, when the target acceleration calculated by the target acceleration calculation process is a deceleration and when the output request brake torque is greater than the maximum brake torque to be generated by the power train mechanism, the vehicle control device instructs both the power train mechanism and the hydraulic brake mechanism to generate the brake torque, respectively.

In such a type of the vehicle control device, when the vehicle control device switches the brake limitation control to the brake use control in order to generate a brake torque by the hydraulic brake mechanism, a brake control value is set in advance so that the brake torque to be generated by the hydraulic brake mechanism becomes zero [N·m] at the time immediately after the above switching.

A description will now be given of a conventional vehicle control device for performing the above control so that the actual acceleration of the driver's vehicle becomes equal to a target acceleration.

FIG. 11 is a timing chart showing a control operation executed by the conventional vehicle control device.

It will be considered that a target acceleration calculated by the target acceleration calculation step is decreased at timing t1, and finally reaches a negative acceleration corresponding to the maximum brake torque (a deceleration speed) at timing t2, as shown in FIG. 11.

Timing t1' and timing t2' shown in FIG. 11 designate a delayed power train control value and a delayed output value which are delayed by the feedback control.

In the above example, the conventional vehicle control device executes the brake limitation control because the output request brake torque is smaller than the maximum brake torque during the period of timing t1 to timing t2. When the output request brake torque is not less than the maximum brake torque at timing t2, the conventional vehicle control device switches the brake limitation control to the brake use control.

Such a conventional vehicle control device has a drawback. That is, when the conventional vehicle control device switches the brake limitation control to the brake use control, it takes a certain period of time until the hydraulic brake mechanism generates an effective brake torque capable of supplying an adequate deceleration to the vehicle, and until the hydraulic brake mechanism generates the brake torque that reaches the target acceleration of the vehicle because the brake torque generated by the hydraulic brake mechanism is zero [N·m] at the timing immediately after the switching is zero [N·m].

That is, the conventional vehicle control device has the problem to cause a time delay until the driver's vehicle completely reaches the target acceleration (deceleration) because a constant deceleration is applied to the driver's vehicle from the state of brake torque of zero [N·m] until the state of generating an effective brake torque, by the hydraulic brake mechanism, to generate the effective acceleration (or deceleration) for the driver's vehicle.

Thus, the conventional vehicle control device often inconveniences the vehicle driver and passengers by the response delay of the actual acceleration of the vehicle from the target acceleration.

SUMMARY OF THE INVENTION

It is an object of the present invention to provide an improved vehicle control device capable of decreasing a response delay between an actual acceleration and a target acceleration.

To achieve the above purposes, the present invention provides a vehicle control device to be mounted to various types of vehicles comprised of a power train mechanism and a brake mechanism. The power train mechanism is capable of generating a drive torque or a brake torque according to a power train control value transferred from the vehicle control device. The brake mechanism is capable of generating a brake torque according to a brake control value transferred from the vehicle control device. The vehicle control device is comprised of a target value calculation means, an acceleration obtaining means, a power train control means, a brake control means, a state detection and switching means, and a first switching time control means. The target value calculation means repeatedly calculates a target acceleration according to a running condition of the driver's vehicle. The acceleration obtaining means obtains an acceleration applied to the driver's vehicle. The power train control means calculates the power train control value so that the acceleration obtained by the acceleration obtaining means reaches the target acceleration calculated by the target value calculation means, and outputs the power train control value to the power train mechanism. The brake control means calculates the brake control value so that the acceleration obtained by the acceleration obtaining means reaches the target acceleration calculated by the target value calculation means.

The state detection and switching means executes a brake limitation control or a brake use control. In the brake limitation control, a transmission of the brake control value from the brake control means to the brake mechanism is halted when an output request torque as a drive torque or a brake torque to be generated by the power train mechanism according to the power train control value calculated by the power train control means is the brake torque of less than a maximum brake torque, or the drive torque. On the other hand, the brake use control allows the brake control means to output the brake control value to the brake control mechanism when the output request torque is the brake torque of not less than the maximum brake torque. The first switching time control means controls the brake control means to output a predetermined control value, with which a predetermined brake torque of more than zero is generated, to the brake mechanism as an initial value of the brake control value when the state detection and switching means switches from the brake limitation control to the brake use control.

FIG. 10 is a timing chart showing an example of the control state of the vehicle control device according to the present invention. FIG. 10 shows the example in which the target acceleration calculated by the target value calculation means starts to decrease from timing t1, and becomes equal to a negative acceleration (deceleration) corresponding to the maximum brake torque at timing t2. Reference character t1' and t2' shown in FIG. 10 designate output delays of the power train control value and the brake control value by the feedback control.

During the period from timing t1 to timing t2 in the vehicle control device according to the present invention, the brake limitation control is executed, and the power train control value is calculated and output to the power train mechanism so that the actual acceleration of the driver's vehicle becomes equal to the target acceleration. That is, the brake torque generated by the power train mechanism is increased until it reaches the maximum brake torque.

Further, when the output request torque becomes not less than the maximum brake torque at timing t2, the brake limitation control is switched to the brake use control, the predetermined control value (namely, the brake control value) is inputted to the brake mechanism in order to generate the predetermined brake torque of more than 0 [N·m]. This predetermined control value instructs the brake mechanism to generate the predetermined brake torque. After this, the vehicle control device according to the present invention performs the feedback control so that the actual acceleration reaches the target acceleration after the predetermined brake torque is generated. The vehicle control device instructs the brake mechanism to increase the brake torque until it reaches the value according to the target acceleration.

That is, according to the vehicle control device according to the present invention, it is possible to decrease the time length to affect the brake torque generated by the brake mechanism to the driver's vehicle, in other words, the vehicle control device according to the present invention can decrease the time interval to apply the brake power generated by the brake mechanism to the driver's vehicle, when compared with the conventional vehicle control devices in which the brake torque generated by the brake mechanism is 0 [N·m] immediately after the brake limitation control is switched to the brake use control.

Therefore, according to the vehicle control device of the present invention, it is possible to decrease the response delay of the actual acceleration to the target acceleration (namely, to increase the actual acceleration of the driver's vehicle to follow the target acceleration). As a result, the vehicle equipped with the vehicle control device according to the present invention can provide driving comfort to the vehicle driver and passengers.

The technical phrase "Stopping the output from the brake control value" includes having the brake control value of zero to be output (namely, the brake torque generated by the brake mechanism is set to zero), in addition to stopping the output of the brake control value itself.

By the way, when the brake mechanism generates some amount of the brake torque immediately after the brake limitation control is switched to the brake use control, it is possible to reliably decrease the time length necessary for the transmission of the brake power by the brake mechanism to the driver's vehicle. It is further possible to smoothly switch the brake torque generated by the power train mechanism to the brake torque generated by the brake mechanism.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
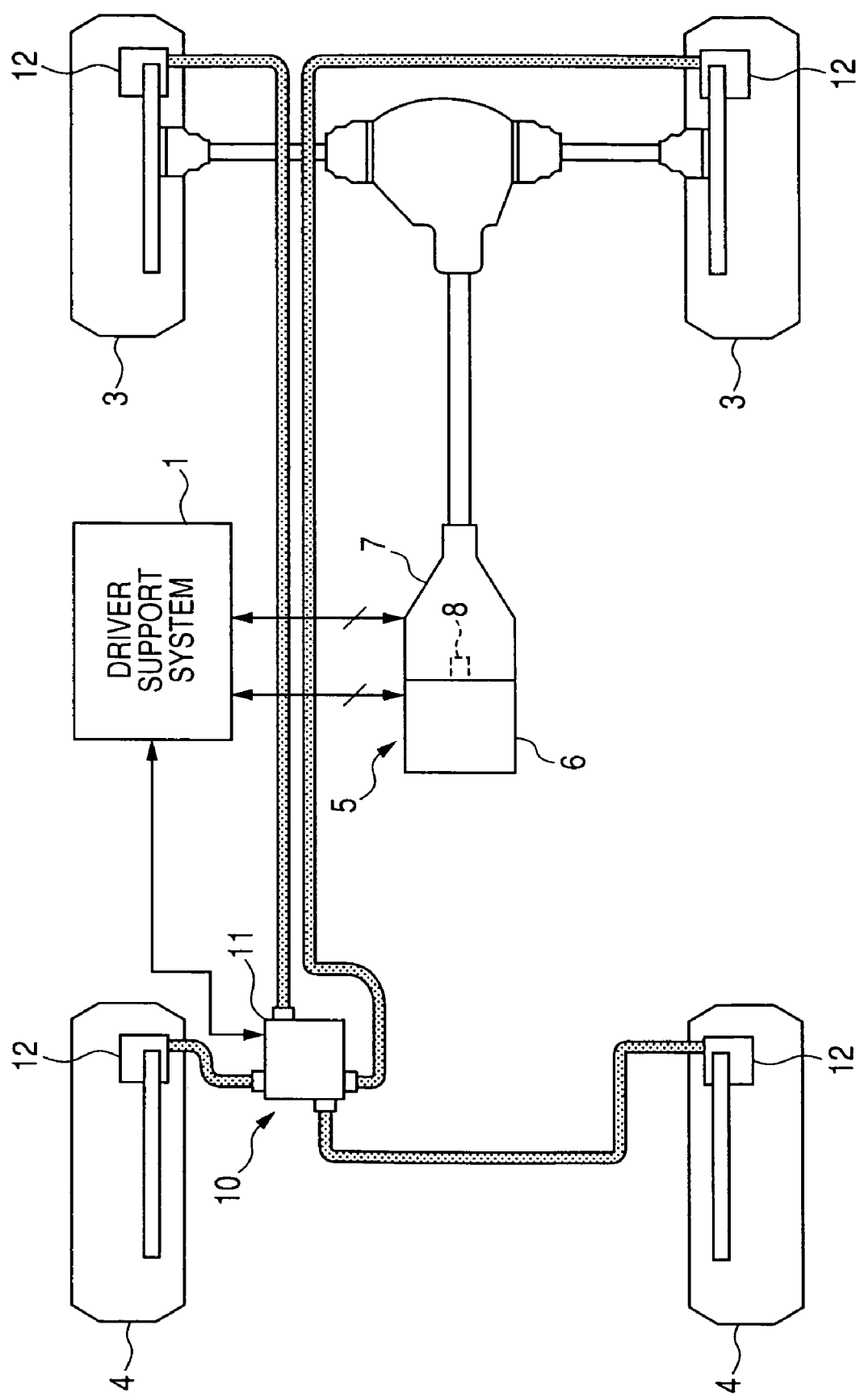
FIG. 1 is a schematic diagram showing a vehicle equipped with a driver support system comprised of a cruise assist electric control device as a vehicle control device according to an embodiment of the present invention.

Hereinafter, various embodiments of the present invention will be described with reference to the accompanying drawings. In the following description of the various embodiments, like reference characters or numerals designate like or equivalent component parts throughout the several diagrams.
Embodiment A description will now be given of the vehicle control device according to an embodiment of the present invention with reference to FIG. 1 to FIG. 9.

Figure 2:
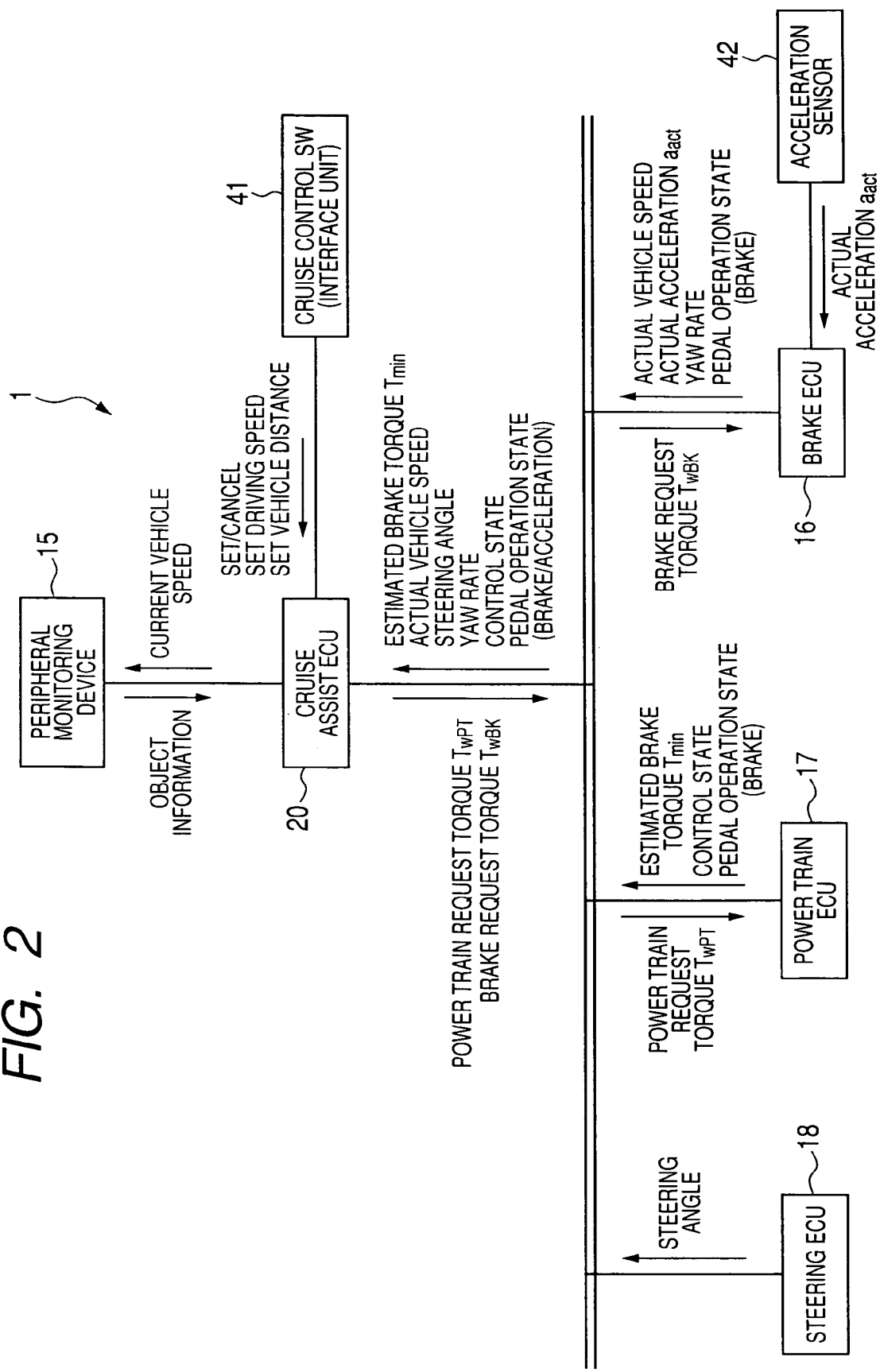
FIG. 2 is a block diagram showing a schematic configuration of the cruise assist system shown in FIG. 1.

FIG. 1 is a schematic diagram showing a vehicle equipped with a driver support system 1. The driver support system 1 is comprised of a cruise assist electric control device that corresponds to the vehicle control device according to the present invention. FIG. 2 is a block diagram showing a schematic configuration of the cruise assist system 1 shown in FIG. 1.

Hereinafter, the vehicle equipped with the driver support system 1 will be referred to as the "driver's vehicle".

As shown in FIG. 1, the driver's vehicle has at least a power train mechanism 5, a brake mechanism 10, and the driver support system 1. The power train mechanism 5 generates a drive torque to accelerate the driver's vehicle and a brake torque to brake the driver's vehicle. The brake mechanism 10 generates a brake torque to brake the driver's vehicle. The driver support system 1 controls the power train mechanism 5 and the brake mechanism 10 to assist the driving of the driver's vehicle.

The power train mechanism 5 is a known device and comprised of an internal combustion engine 6 (such as a gasoline engine in the embodiment as a power source of the driver's vehicle) and a transmission mechanism 7. The transmission mechanism 7 is comprised of a clutch and a plurality of gears (as a known planetary gear automatic transmission in the embodiment). The clutch is connected with the crank shaft 8 of the internal combustion engine 6. The power train mechanism 5 transmits to driving wheels 3 the drive torque or the brake torque having a magnitude corresponding to a rotation speed of the internal combustion engine 6 and a speed ratio (a combination of engaged gears) of the transmission mechanism 7. The brake mechanism 10 is also a known device that is comprised of wheel cylinders 12 and a brake actuator 11. The wheel cylinders 12 are mounted to each of wheels. The wheels of the driver's vehicle are divided into driving wheels 3 and trailing wheels 4. The brake actuator 11 controls a pressure increasing control valve and a pressure decreasing control valve to open and close. The pressure increasing control valve and a pressure decreasing control valve are mounted to a brake hydraulic circuit. The brake hydraulic circuit supplies a working fluid such as a brake oil to the wheel cylinders 12. That is, the brake mechanism 10 generates a brake torque corresponding to the pressure of the working fluid supplied to the wheel cylinders 12 from the brake actuator 11.

By the way, the brake mechanism 10 performs various controls to the driver's vehicle such as a cruise control, an adaptive cruise control (so called as ACC), and a pre-crash safety control (so called as PCS).

The driver support system 1 performs the cruise control to control the power train mechanism 5 and the brake mechanism 10 so that the running speed of the driver's vehicle approaches a set speed (as a target speed) that is set in advance by the driver of the vehicle.

The driver support system 1 also performs the adoptive cruise control (ACC) to control the power train mechanism 5 and the brake mechanism 10 so that a vehicle distance between the driver's vehicle and a front running vehicle in front of the driver's vehicle is kept to a target vehicle distance that is set in advance by the driver of the vehicle.

The driver support system 1 further performs the pre-crash safety control (PCS) to increase the brake torque (as a brake power) to be applied to the driver's vehicle when detecting a possibility of not less than a predetermined value that the driver's vehicle would crush into obstacles (such as front running vehicles and guide rails) that exist in front of the driver's vehicle.

As shown in FIG. 2, the driver support system 1 is equipped with a peripheral monitoring device 15 to detect obstacles existing around (for example, in front of) the driver's vehicle.

The peripheral monitoring device 15 is connected to a cruise assist electric control device 20 (hereinafter, referred to as the "cruise assist ECU 20"). The cruise assist ECU 20 is connected to a brake electric control device 16 (hereinafter, referred to as the "brake ECU 16"), a power train electric control device 17 (hereinafter, referred to as the "power train ECU 17"), and a steering electric control device 18 (hereinafter, referred to as the "steering ECU 18") through a LAN (Local Area Network) communication bus.

Each of the brake ECU 16, the power train ECU 17, the steering ECU 18, and the cruise assist ECU 20 is comprised mainly of a microcomputer, a read only memory (ROM), and a random access memory (RAM), and a bus controller, which are commercially available.

The ROM is capable of storing data and programs, and maintaining those data even if an electrical supply is interrupted. The RAM is capable of storing temporal data items during the execution of the programs. The CPU executes the programs stored in the ROM and RAM. The bus controller controls the data communication between each of the ECUs 16, 17, 18, and 20 and other devices through communication buses for a local area network (LAN).

The peripheral monitoring device 15 is a millimeter wave radar device of a FMCW (Frequency Modulated Continuous Wave) type that is capable of receiving at least current speed information of the driver's vehicle transmitted from the cruise assist ECU 20. Further, the peripheral monitoring device 15 transmits and receives a continuous wave (hereinafter, referred to as the "radar wave") in a millimeter wave band processed by a frequency modulation in order to detect objects such as front running vehicles and roadside objects (such as guide rails, traffic signals, and sign boards). The peripheral monitoring device 15 generates object information and then transmits the object information to the cruise assist ECU 20. The object information includes at least a relative speed between the driver's vehicle and the object, and the position (distance and direction) of the object.

The brake ECU 16 transmits an operation state of the brake pedal of the driver's vehicle (hereinafter, referred to as the "brake pedal operation state") based on detection information transmitted from a master cylinder (M/C) pressure sensor in addition to state information (namely, vehicle speed and yaw rate) transmitted from an acceleration sensor 42, a vehicle speed sensor (not shown), a yaw rate sensor. The acceleration sensor 42 detects an actual acceleration $a_{act}$.

Further, the brake ECU 16 receives a brake request torque $T_{wBK}$ transferred from the cruise assist ECU 20, and drives the brake actuator 11 mounted to the brake mechanism 10 based on the brake request torque $T_{wBK}$. This brake request torque $T_{wBK}$ represents a magnitude of a brake torque to be generated by the brake mechanism 10. That is, the brake ECU 16 controls the brake mechanism 10 to generate the brake torque in response to the brake request torque $T_{wBK}$ transferred from the cruise assist ECU 20.

The power train ECU 17 estimates a maximum brake torque (or a minimum drive torque, hereinafter, referred to as the "estimated output possible torque $T_{min}$" that is possible to be output) based on state information transferred from a throttle open sensor (not shown) and an accelerator pedal open sensor (not shown), and the currently selected gear stage number (or a gear ratio), and then transmits the estimated output possible torque $T_{min}$ to the cruise assist ECU 20, where the state information is a current vehicle speed, an engine control state, and an accelerator pedal operation state.

The power train ECU 17 receives the power train request torque $T_{wPT}$ representing the magnitude of the drive torque or the brake torque, to be generated by the power train mechanism 5, transferred from the cruise assist ECU 20. Based on the received power train request torque $T_{wPT}$, the power train ECU 17 outputs a driving instruction Te (see FIG. 3) to the throttle actuator capable of adjusting the opening ratio of the throttle of the internal combustion engine 6 and a changing instruction to change the gear state to the transmission mechanism 7. That is, the power train ECU 17 instructs the power train mechanism 5 to generate the drive torque or the brake torque in proportion to the magnitude of the power train request torque $T_{wPT}$ transferred from the cruise assist ECU 20.

The steering ECU 18 obtains a detection signal (namely, representing a steering angle) transferred from a steer angle sensor (not shown) for detecting a steering angle, and outputs the obtained detection signal to the cruise assist ECU 20. The steering ECU 18 further performs a power steering control to generate an assist power when the steering angle of the steering wheel is changed.

By the way, the cruise assist ECU 20 calculates an acceleration to be achieved by the driver's vehicle (that is, hereinafter, referred to as the "target acceleration $A_{req}$", see FIG. 3) according to the driving condition of the driver's vehicle in order to keep a target speed of the driver's vehicle, and a target distance between the driver's vehicle and a front running vehicle.

Further, the cruise assist ECU 20 calculates a power train request torque $T_{wPT}$ and a brake request torque $T_{wBK}$ (as control values of the power train mechanism 5 and the brake mechanism 10) so that the acceleration applied to the driver's vehicle becomes equal to the calculated target acceleration $A_{req}$.

The cruise assist ECU 20 then outputs the calculated power train request torque $T_{wPT}$ and the brake request torque $T_{wBK}$ to the power train ECU 17 and the brake ECU 16, respectively. In order to achieve the above calculation and control operation, the cruise assist ECU 20 is connected to a cruise control switch 14 through which the driver of the vehicle inputs a target vehicle speed and a target distance between the driver's vehicle and a front running vehicle. The cruise assist ECU 20 is capable of inputting object information transferred from the peripheral monitoring device 15, a current vehicle speed, the engine control condition, the acceleration pedal operation state, and an estimated output possible torque $T_{min}$, which is possible to output, transferred from the power train ECU 17, and a steering angle, a yaw rate, and a break pedal operation state and the like transferred from the brake ECU 16.

The cruise control switch 14 is an interface unit that is equipped with at least a set switch (not shown) and a cancel switch (not shown), a target vehicle speed input unit (not shown), and a target distance input unit (not shown). The vehicle driver operates the set switch to start various types of control operations (such as PSC and a cruise control, or ACC). The vehicle driver operates the cancel switch to terminate the various types of control operations. The vehicle driver inputs the target vehicle speed and the target vehicle distance through the target vehicle speed input unit and the target distance input unit, respectively.

(Cruise Assist ECU 20)

Next, a description will be given of the cruise assist ECU 20.

Figure 3:
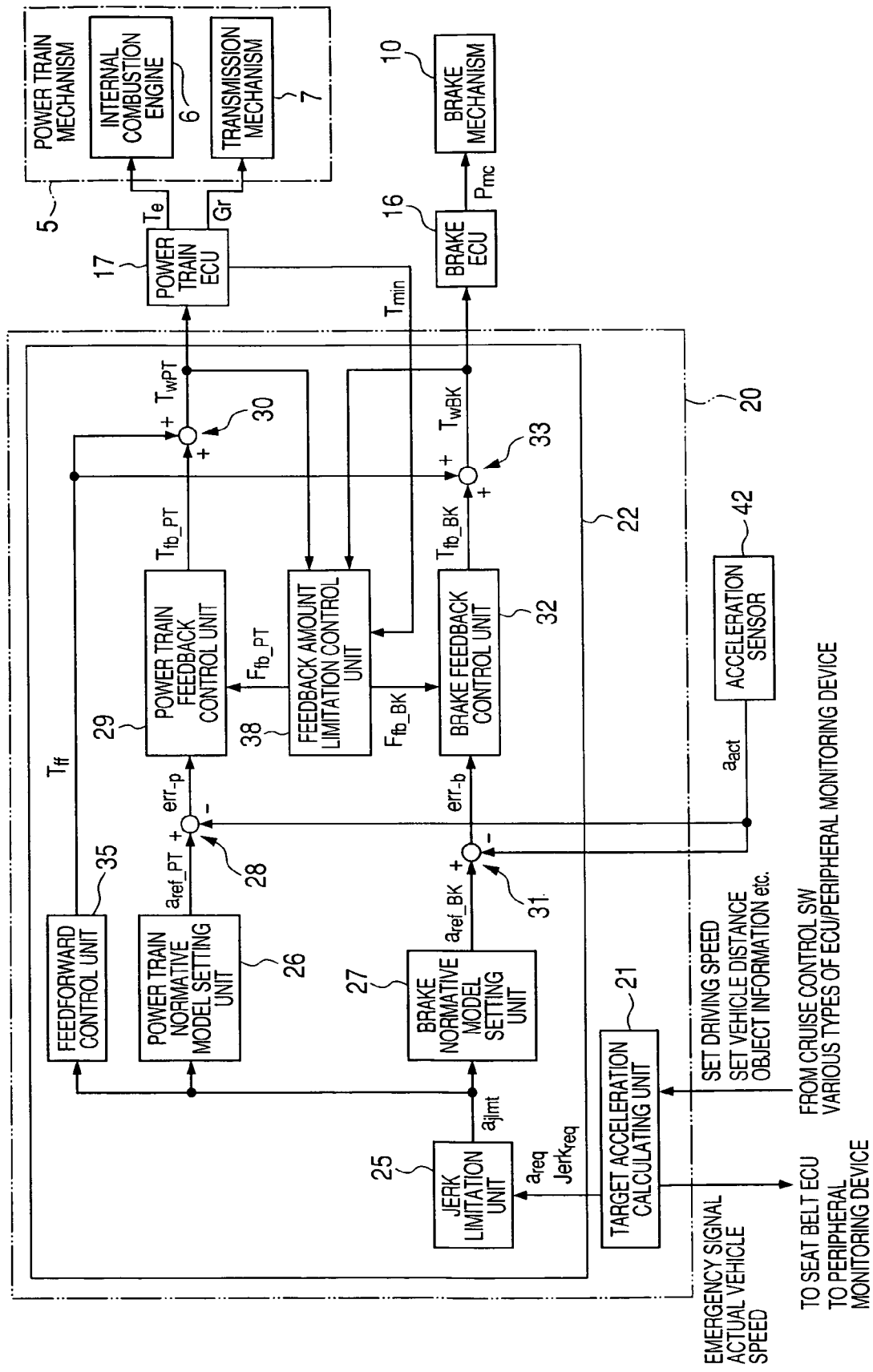
FIG. 3 is a schematic diagram showing a functional configuration of a cruise assist ECU in the driver support system and peripheral devices of the cruise assist ECU shown in FIG. 1 and FIG. 2.

FIG. 3 is a schematic diagram showing a functional configuration of the cruise assist ECU 20 in the driver support system and peripheral devices of the cruise assist ECU shown in FIG. 1 and FIG. 2.

As shown in FIG. 3, the cruise assist ECU 20 is comprised of a target acceleration calculating unit 21 and an acceleration control unit 22. The target acceleration calculating unit 21 repeatedly calculates a target acceleration $a_{req}$ every time interval which is set in advance. The acceleration control unit 22 calculates the power train request torque $T_{wPT}$ and the brake request torque $T_{wBK}$ according to the target acceleration $a_{req}$ calculated by the target acceleration calculating unit 21.

When inputting a control signal representing the operation of the set switch, the target acceleration calculating unit 21 repeatedly executes application programs at a predetermined time interval to execute the cruise control, the adaptive cruise control (ACC), or the pre-crash safety control (PCS). The target acceleration calculating unit 21 thereby calculates the target acceleration $a_{req}$ based on the various types of input information previously described.

The target acceleration calculating unit 21 calculates a limit value (hereinafter, referred to as the "request Jerk limit value $Jerk_{req}$") to prevent (or limit) the occurrence of changing the target acceleration $a_{req}$ of not less than a predetermined value, where the change of the target accelerations is obtained between the target accelerations which are the continuously calculated, and the target acceleration $a_{req}$ is calculated every predetermined time interval.

That is, the target acceleration calculating unit 21 repeatedly executes the application programs at the predetermined time interval in order to calculate the target acceleration $a_{req}$ and the request jerk limit value $Jerk_{req}$, and then outputs them to the acceleration control unit 22.

(Acceleration Control Unit 22)

Next, a description will be given of the acceleration control unit 22.

The acceleration control unit 22 calculates and outputs the power train request torque $T_{wPT}$ and the brake request torque $T_{wBK}$ by executing the processing program every a shorter time interval (referred to as the "set period Td") rather than the set timing.

The acceleration control unit 22 is comprised of a jerk limitation unit 25, a power train normative model set unit 26, and a brake normative model setting unit 27.

The jerk limitation unit 25 calculates a target acceleration $a_{jlmt}$ after the jerk limitation that is obtained by limiting the change amount of the target acceleration $a_{req}$ output from the target acceleration calculating unit 21 every regulative timing within a regulative range.

Figure 4:
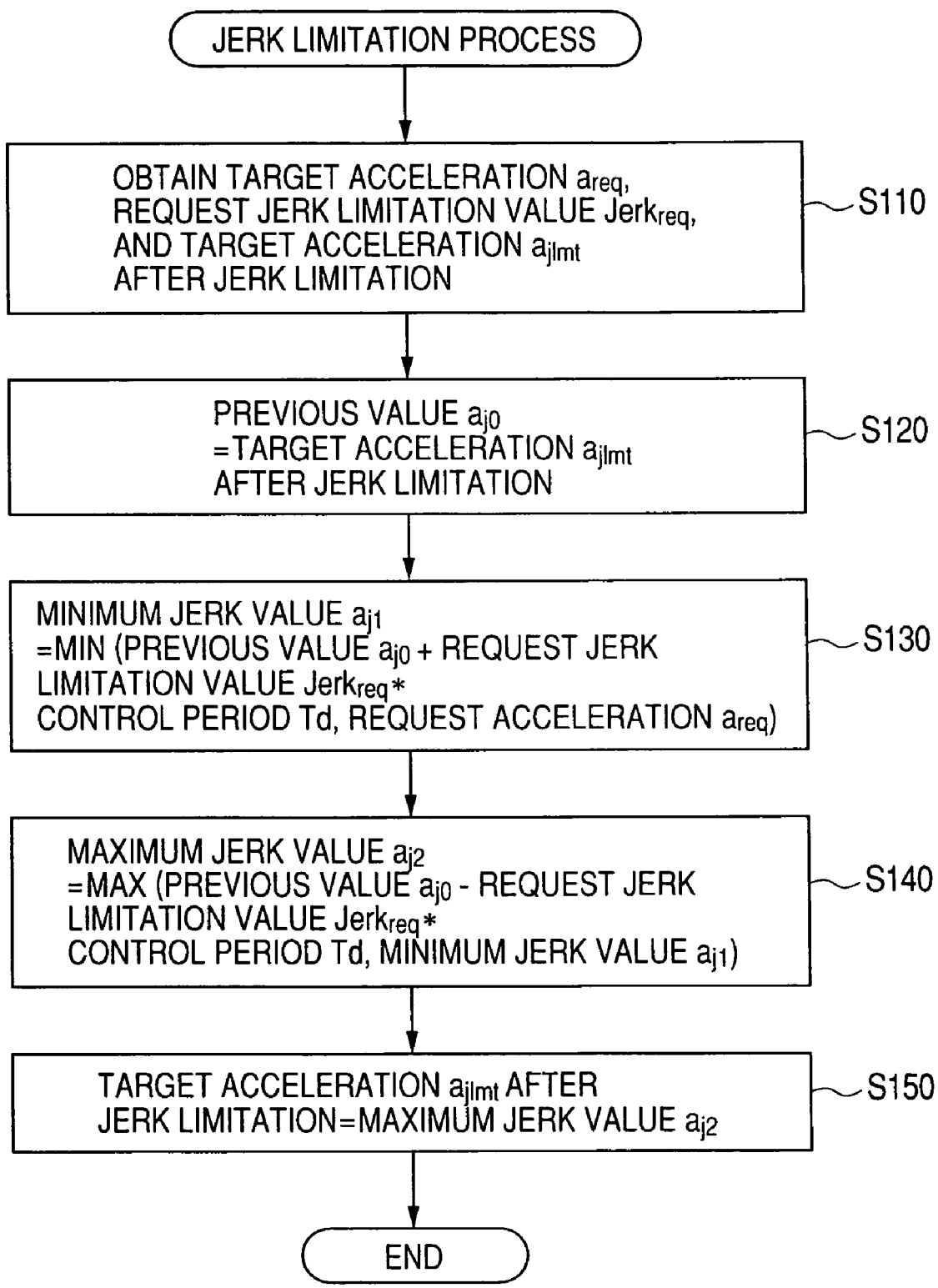
FIG. 4 is a flow chart showing a jerk limitation process performed by the driver support system having the vehicle control device according to the embodiment of the present invention.
Figure 5:
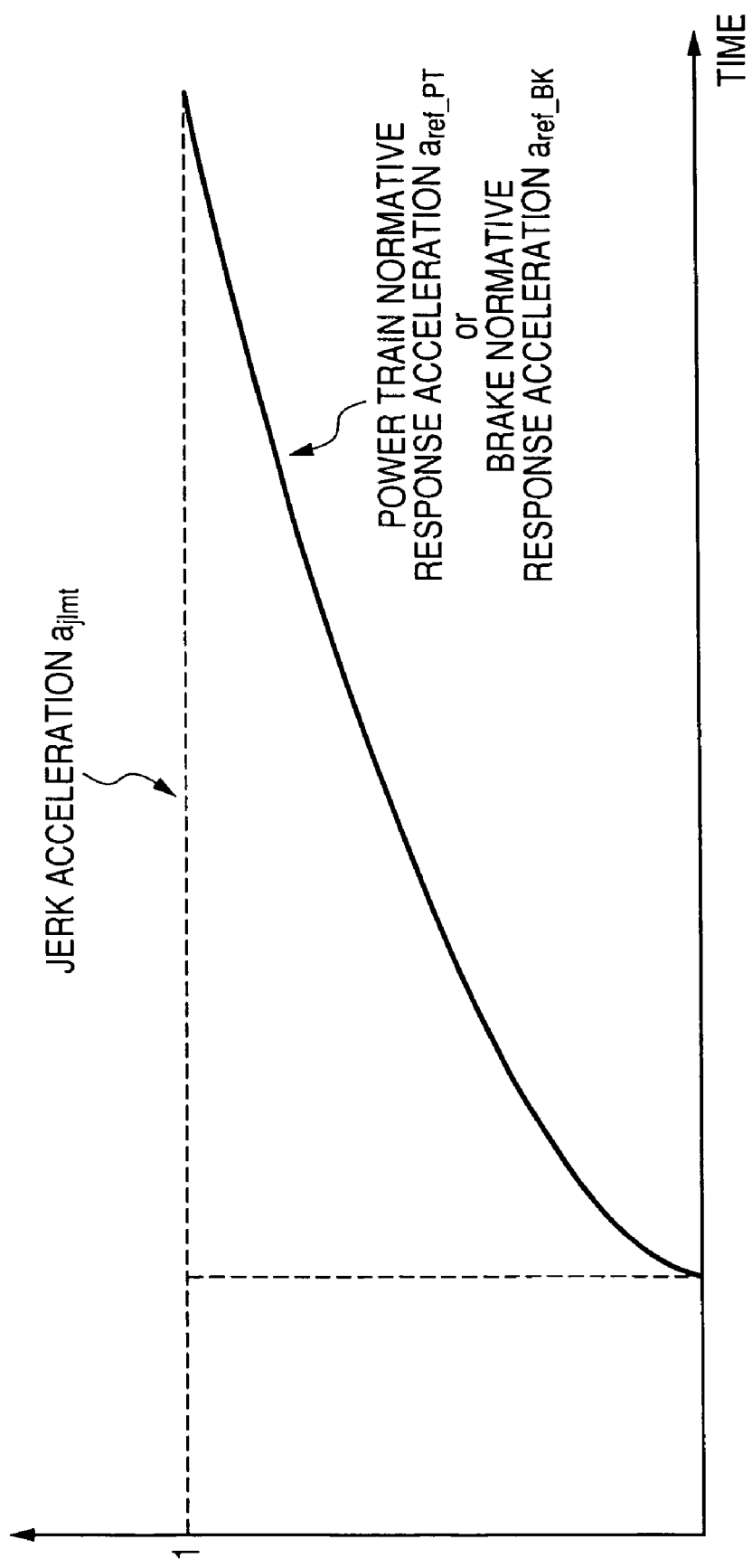
FIG. 5 is an example of a normative model for the jerk limitation process shown in FIG. 4.

FIG. 5 is an example of a normative model for the jerk limitation process shown in FIG. 4.

The power train normative model setting unit 26 and the brake normative model setting unit 27 input the target acceleration $a_{jlmt}$ after the jerk limitation transferred from the jerk limitation unit 25 to the normative model made of a time lag model of a first order shown in FIG. 5, and generate a power train normative response acceleration $a_{ref-PT}$ and a brake normative response acceleration $a_{ref-BK}$.

The power train normative response acceleration $a_{ref-PT}$ is an acceleration that is necessary to achieve the target acceleration $a_{jlmt}$ after the jerk limitation by the power train mechanism 5 in an ideal condition (that is, regardless of disturbance. The brake normative response acceleration $a_{ref-BK}$ is an necessary acceleration to achieve the target acceleration $a_{jlmt}$ after the jerk limitation by the brake mechanism 10 in the ideal condition.

The acceleration control unit 22 is further comprised of a power train deviation calculating unit 28 and a power train feedback control unit 29. The power train deviation calculating unit 28 calculates a difference (hereinafter referred to as the "power train acceleration deviation $err_{-p}$") between the power train normative response acceleration $a_{ref-PT}$ generated by the power train normative model setting unit 26 and the actual acceleration $a_{act}$ transferred from the acceleration sensor 42. The power train feedback control unit 29 calculates a power train feedback torque $T_{fb-PT}$ as a feedback control amount (namely, a drive torque or a brake torque) to the power train mechanism 5 based on the power train acceleration deviation $err_{-p}$ calculated by the power train deviation calculating unit 28.

The acceleration control unit 22 is further comprised of a brake deviation calculation unit 31 and a brake feedback control unit 32. The brake deviation calculation unit 31 calculates a difference (hereinafter, referred to as the "brake acceleration deviation $err_{-B}$") between the brake normative response acceleration $a_{ref-BK}$ generated by the brake normative model setting unit 27 and the actual acceleration $a_{act}$ transferred from the acceleration sensor 42. The brake feedback control unit 32 calculates a brake feedback torque $T_{fb-BK}$ as a feedback control amount to the brake mechanism 10 based on the brake acceleration deviation err-b calculated by the brake deviation calculation unit 31.

The acceleration control unit 22 is further comprised of a feedforward control unit 35, a power train control amount calculating unit 30, and a brake control amount calculation unit 33.

The feedforward control unit 35 calculates a feedforward torque $T_{ff}$ (namely, a drive torque or a brake torque) as a feedforward control amount to adjust a decreased amount of the drive torque (or an increased amount of the brake torque) generated by the driving resistance of the driver's vehicle. The power train control amount calculating unit 30 calculates the power train request torque $T_{wPT}$ based on the power train feedback torque $T_{fb-PT}$ calculated by the power train feedback control unit 29, the feedforward torque $T_{ff}$ calculated by the feedforward control unit 35. The brake control amount calculation unit 33 calculates the brake request torque $T_{wBK}$ based on the power train feedback torque $T_{fb-PT}$ calculated by the brake feedback control unit 32 and the feedforward torque $T_{ff}$.

The acceleration control unit 22 further has a feedback amount limitation control unit 38 capable of limiting the power train feedback torque $T_{fb-PT}$ output from the power train feedback control unit 29 or the brake feedback torque $T_{fb-BK}$ output from the brake feedback control unit 32 according to the driving condition of the driver's vehicle.

(Jerk Limitation Unit 25)

Next, a description will be given of the jerk limiting process to perform the cruise assist ECU 22 as the jerk limitation unit 25.

FIG. 4 is a flow chart showing the jerk limitation process performed by the driver support system having the vehicle control device according to the embodiment of the present invention.

This jerk limitation process is executed every set timing. In step S110, when the jerk limitation process starts, the target acceleration $a_{req}$ and the request jerk limitation value $Jerk_{req}$ are obtained. The target acceleration $a_{jlmt}$ after the jerk limitation output from the jerk limitation unit 25 is obtained.

In step S120, the target acceleration $a_{jlmt}$ after the jerk limitation obtained in step S110 is set as the output value (hereinafter, referred to as the "previous value aj0") when the previous jerk limitation process is executed. The operation flow progresses to step S130.

In step S130, a small value between the first calculation value and the target acceleration Areq is set as a minimum jerk value aj1.

In step S140, a large value between the second calculation value and the minimum jerk value aj1 is set as a maximum jerk value aj2.

The first calculation value used in the embodiment is obtained by adding a previous value aj0 to a value obtained by multiplying the set period Td with the request jerk limitation value $Jerk_{req}$. (That is, First calculation value=Previous value $aj0$+Request jerk limitation value $Jerk_{req}$×Set period Td). The second value used in the embodiment is obtained by subtracting the value, obtained by multiplying the request jerk limitation value $Jerk_{req}$ and the set period Td, from the previous value $aj0$. (That is, Second value=Previous value $aj0$−Request jerk limitation value $Jerk_{req}$×Set period Td).

In step S150, the maximum jerk value $aj2$ obtained in step S140 is set as the target acceleration $a_{jlmt}$ after the jerk limitation. The jerk limitation process is thereby completed.

That is, in order to prevent the driver's vehicle from being rapidly accelerated or braked by increasing the change of the target acceleration $a_{req}$ that is repeatedly obtained every set period Td, the jerk limitation process calculates the target acceleration $a_{jlmt}$ after the jerk limitation while satisfying that the change of the target acceleration $a_{req}$ is within the set range.

(Feedforward Control Unit 35)

Next, a description will be given of the feedforward control unit 35.

The feedforward control unit 35 calculates a feedforward control amount (hereinafter, referred to as the "air resistance adjusting torque") due to an air resistance, a feedforward control amount (hereinafter, referred to as the "rolling resistance adjusting torque") due to a road surface resistance (or a rolling resistance), and a feedforward control amount (hereinafter, referred to as the "acceleration resistance adjusting torque") due to gravity (or an acceleration resistance).

The feedforward control unit 35 sums the above feedforward control amounts and outputs the sum as a feedforward torque $T_{ff}$.

The air resistance adjusting torque, the rolling resistance adjusting torque, and the acceleration resistance adjusting torque are obtained by the following equations, respectively:

$$\text{Air resistance adjusting torque} = (\rho/2)CdAv^2 \times r \quad (1);$$

$$\text{Rolling resistance adjusting torque} = \mu Mg \times r \quad (2); \text{ and}$$

$$\text{Acceleration resistance adjusting torque} = Ma_{act} \times r \quad (3),$$

where $\rho$ is an air density [kg/m$^3$], Cd is an air resistance coefficient, A is a front projected area of a vehicle [m$^2$], v is a current vehicle speed [m/s], $\mu$ is a rolling resistance coefficient, [m/s$^2$], r is a radius [m] of a drive wheel.

When the target acceleration $a_{jlmt}$ after jerk limitation is a negative acceleration (namely, when the driver's vehicle is decelerated), the feedforward control unit 35 calculates the feedforward torque $T_{ff}$ so that the power train control amount calculating unit 30 outputs the power train request torque $T_{wPT}$ with which the power train mechanism 5 generates a brake torque.

Further, when the target acceleration $a_{jlmt}$ after jerk limitation is a positive acceleration or a constant (namely, when the driver's vehicle is accelerated or runs at a constant vehicle speed), the feedforward control unit 35 calculates the feedforward torque $T_{ff}$ so that the power train control amount calculating unit 30 outputs the power train request torque $T_{wPT}$ with which the power train mechanism 5 generates the drive torque (or the torque of 0 [N·m]).

(Feedback Amount Limitation Control Unit 38)

Next, a description will be given of the feedback amount limitation control unit 38.

The feedback amount limitation control unit 38 switches to a brake feedback use state (corresponding to a brake use control) or a brake feedback limitation state (corresponding to a brake limitation control) according to a running state of the driver's vehicle. The brake feedback use state is a state to limit the power train feedback torque $T_{fb-PT}$ output from the power train feedback control unit 29. The brake feedback limitation state is a state to limit the brake feedback torque $T_{fb-BK}$ output from the brake feedback control unit 32.

Figure 6:
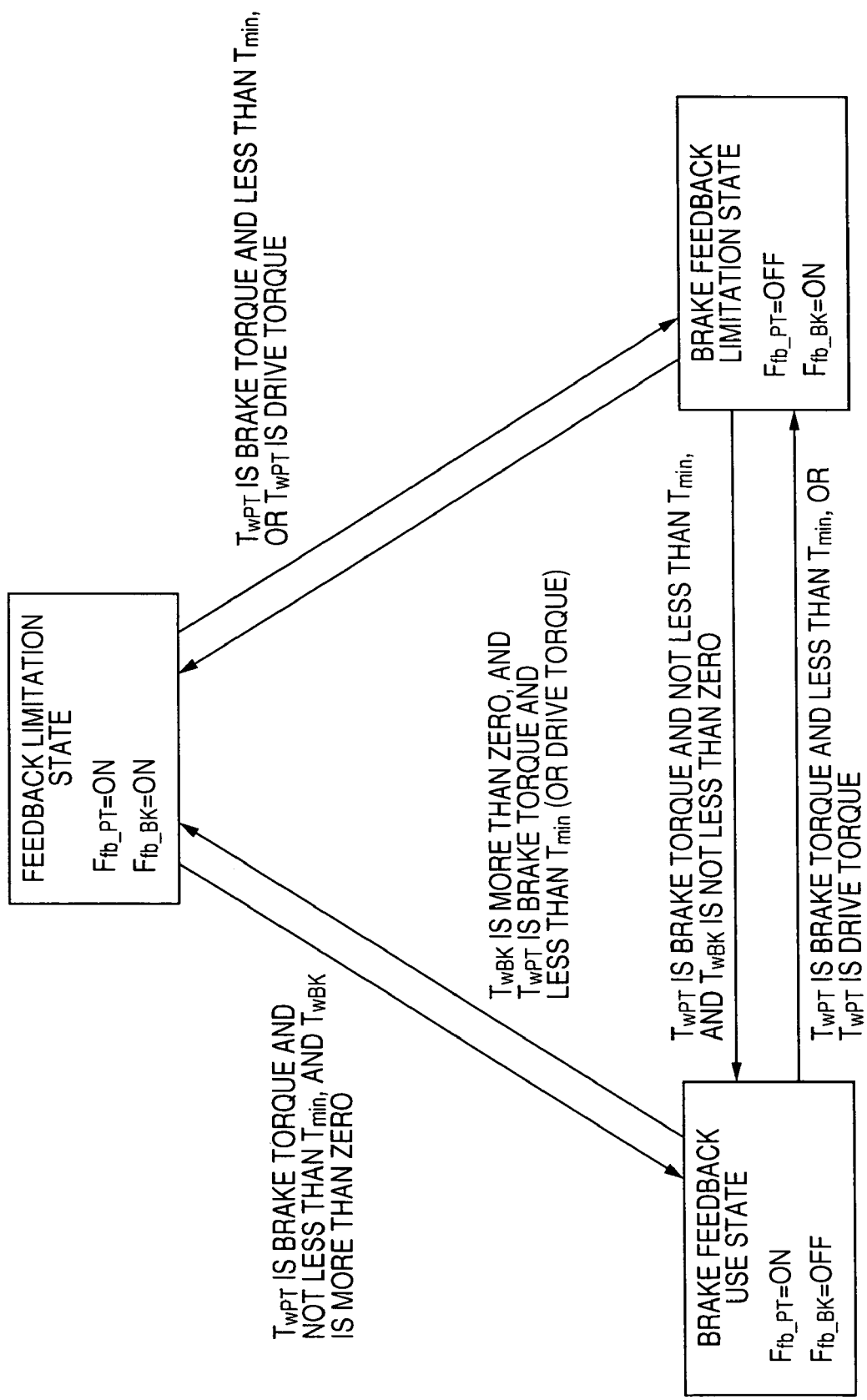
FIG. 6 is an explanatory diagram showing a process of switching a control state performed by a feedback amount limitation control unit in the driver support system having the vehicle control device according to the embodiment of the present invention.

FIG. 6 is an explanatory diagram showing the process of switching a control state performed by the feedback amount limitation control unit 38 in the driver support system having the vehicle control device according to the embodiment of the present invention.

Specifically, as shown in FIG. 6, the feedback amount limitation control unit 38 according to the embodiment selects the brake feedback limitation state when the power train request torque $T_{wPT}$ is the drive torque. Further, the feedback amount limitation control unit 38 selects the brake feedback limitation state when the power train request torque $T_{wPT}$ is the brake torque and the power train request torque $T_{wPT}$ is less than the estimated output possible torque $T_{min}$ (where, the estimated output possible torque $T_{min}$ is a brake torque).

In the brake feedback limitation state, a power train feedback flag $F_{fb-PT}$ is set to OFF (namely, set to a low level), and a brake feedback flag $F_{fb-BK}$ is set to ON (namely, set to High level).

The feedback amount limitation control unit 38 selects the brake feedback use state when the power train request torque $T_{wPT}$ is a brake torque, the power train request torque $T_{wPT}$ is not less than the estimated output possible torque $T_{min}$ (where, the estimated output possible torque $T_{min}$ is a brake torque), and when the brake request torque $T_{wBK}$ is not less than zero (0 [N·m]).

In the brake feedback use state, the power train feedback flag $F_{fb-PT}$ is set to ON (namely, set to High level), and the brake feedback flag $F_{fb-BK}$ is set to OFF (namely, set to low level).

That is, the feedback amount limitation control unit 38 selects the brake feedback limitation state when only the power train mechanism 5 can generate the drive torque or the brake torque necessary to achieve the target acceleration $a_{req}$.

On the other hand, the feedback amount limitation control unit 38 selects the brake feedback use state when only the power train mechanism 5 can generate the brake torque necessary to achieve the target acceleration $a_{req}$ and when there is further a necessary to generate the brake torque by both the brake mechanism 10 in addition to the power train mechanism 5.

The feedback amount limitation control unit 38 selects the feedback limitation state to limit both the power train feedback torque $T_{fb-PT}$ output from the power train feedback control unit 29 and the brake feedback torque $T_{fb-BK}$ output from the brake feedback control unit 32 when the feedback amount limitation control unit 38 does not select any of the brake feedback use state and the brake feedback limitation state.

In the feedback limitation state, both the power train feedback flag $F_{fb-PT}$ and the brake feedback flag $F_{fb-BK}$ are set to ON state (namely, set to High level).

It can be considered that the state other than both the brake feedback limitation state and the brake feedback use state is obtained when the power train request torque $T_{wPT}$ is a drive torque and the brake request torque $T_{wBK}$ is larger than zero (0 [N·m]).

Hereinafter, it will be referred to as the "brake limitation release timing" when the brake feedback limitation state is switched to the brake feedback use state. It will further be referred to as the "brake limitation start timing" when the brake feedback use state is switched to the brake feedback limitation state.

<Power Train Feedback Control Unit 29>

Next, a description will be given of the power train feedback control process in which the cruise assist ECU 20 acts as the power train feedback control unit 29.

Figure 7:
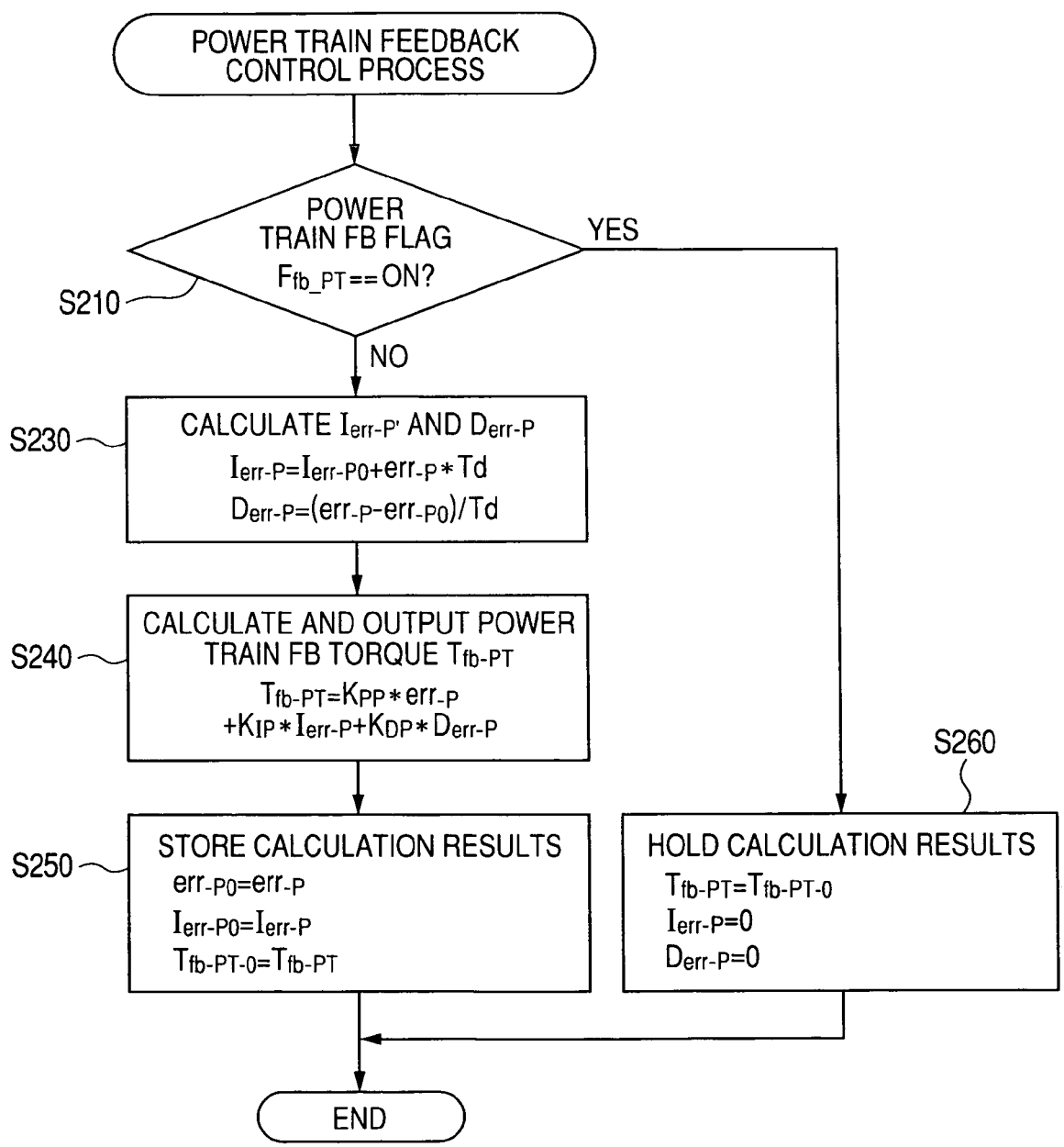
FIG. 7 is an explanatory diagram showing a power train feedback control process performed by the power train feedback control unit in the driver support system with the vehicle control device according to the embodiment of the present invention.

FIG. 7 is an explanatory diagram showing a power train feedback control process performed by the power train feedback control unit 29 in the driver support system equipped with the vehicle control device according to the embodiment of the present invention.

The power train feedback control process is repeatedly started every setting timing. When started, it is detected whether or not the power train feedback flag $F_{fb\text{-}PT}$ is ON state (High level) in step S210. When the detection result indicates that the power train feedback flag $F_{fb\text{-}PT}$ is is OFF state, namely, Low level, the power train feedback control unit 29 (namely, the cruise assist ECU 20) detects that the current state is the brake feedback limitation state. Thereby the operation flow progresses to step S230.

In step S230, the power train feedback control unit 29 calculates a differential value $I_{err\text{-}P}$ and an integral value $D_{err\text{-}P}$ of the power train acceleration deviation in the power train feedback process currently executed based on the power train acceleration deviation $err_{\text{-}P}$ transferred from the power train deviation calculating unit 28.

Hereinafter, the currently executed power train feedback control process is referred to as the "current processing cycle", and the previously executed power train feedback control process is referred to as the "pre-processing cycle".

In the embodiment, the differential value $I_{err\text{-}P}$ of the current cycle is obtained by adding a value to the differential value $I_{err\text{-}P0}$ obtained in the previously processing cycle in step S230, where the value is obtained by multiplying the power train acceleration deviation $err_{\text{-}P}$ calculated by the power train deviation calculating unit 28 by the set period Td (that is, Differential value $I_{err\text{-}P}$=Differential value $I_{err\text{-}P0}$+ Power train acceleration deviation $err_{\text{-}P}$×Set period Td).

The integral value $D_{err\text{-}P}$ of the current process is obtained by dividing the difference by the set period Td, where the difference is obtained by subtracting the power train acceleration deviation $err_{\text{-}P0}$ calculated by the power train deviation calculating unit 28 from the power train acceleration deviation $err_{\text{-}P}$ currently processed by the power train deviation calculating unit 28 (that is, Integral value $D_{err\text{-}P}$=(Power train acceleration deviation $err_{\text{-}P}$−Power train acceleration deviation $err_{\text{-}P0}$)/Set period Td), where the reference character p0 designates a previous cycle.

In step S240, the power train feedback control unit 29 calculates and outputs the currently processed power train feedback flag $F_{fb\text{-}PT}$.

Specifically, in the embodiment of the present invention, a sum of a proportion term, a differential term, an integral term is obtained as the power train feedback torque $T_{fb\text{-}PT}$ of the current process.

The proportion term is obtained by multiplying the power train acceleration deviation $err_{\text{-}P}$, calculated in the current processing cycle by the power train deviation calculating unit 28, by a proportional gain $K_{pp}$ set in advance (that is, Proportion term=Power train acceleration deviation $err_{\text{-}P}$×Proportional gain $K_{PP}$).

The differential term is obtained by multiplying the differential value $I_{err\text{-}P}$ of the current processing cycle by a differential gain $K_{IP}$ that is set in advance (that is, Differential term=Differential value $I_{err\text{-}P}$×Differential gain $K_{IP}$). The integral term is obtained by multiplying the integral value $D_{err\text{-}P}$ of the current processing cycle by the integral gain $K_{DP}$ that is set in advance (that is, Integral term=Integral value $D_{err\text{-}P}$×Integral gain $K_{DP}$).

In step S250, the power train acceleration deviation $err_{\text{-}P}$ of the current processing cycle calculated by the power train deviation calculating unit 28, the differential value $I_{err\text{-}P}$ of the current processing cycle in step S230, and the power train feedback flag $F_{fb\text{-}PT}$ of the current processing cycle calculated in step S240 are stored.

That is, the power train acceleration deviation $err_{\text{-}P}$, the differential value $I_{err\text{-}P}$, and the power train feedback torque $T_{fb\text{-}PT}$ are stored, as those values in the previous processing cycle, before the execution of a next power processing cycle.

After this, the power train feedback control process of the current processing cycle is completed.

That is, the power train feedback control process of the embodiment calculates and outputs the power train feedback torque $T_{fb\text{-}PT}$ using the PID control model unless in the brake feedback limitation state.

When the detection result in step S210 indicates that the power train feedback flag $F_{fb\text{-}PT}$, is ON state (or High level), the power train feedback control unit 29 detects that the current state is the brake feedback use state or the feedback limitation state. The operation flow thereby progresses to step S260.

In step S260, the power train feedback torque $T_{fb\text{-}PT}$ of the previous processing cycle is output as the power train feedback torque $T_{fb\text{-}PT}$ of the current processing cycle. In addition, this power train feedback torque $T_{fb\text{-}PT}$ of the current processing cycle is stored so as to use it as that of the previous processing cycle in a next power train feedback control process. (Hereinafter, this power train feedback torque $T_{fb\text{-}PT}$ obtained in step S260 is expressed as the power train feedback torque $T_{fb\text{-}PT\text{-}0K}$.)

Because the brake feedback limitation state is switched to the brake feedback use state when the power train request torque $T_{wPT}$ (only as the brake torque) is not less than the estimated output possible torque $T_{min}$, and when the brake request torque is not less than 0 [N·m], the power train feedback torque $T_{fb\text{-}PT}$ of the current processing cycle output in step S260 usually becomes than the estimated output possible torque $T_{min}$ (only as the brake torque) or the drive torque.

This means that the power train control amount calculating unit 30 is constructed so that the power train request torque $T_{wPT}$ is obtained based on the power train feedback torque $T_{fb\text{-}PT}$ and the feed forward torque $T_{ff}$, that is, so that the power train mechanism 5 generates the brake torque when the driver's vehicle is decelerated, and generates the drive torque when the driver's vehicle is accelerated.

In step S260, the differential term and the integral term in the power train feedback torque $T_{fb\text{-}PT}$ are initialized, for example, to zero. This prevents that the power train feedback torque $T_{fb\text{-}PT}$ becomes a larger value than the drive torque or the brake torque necessary to achieve the target acceleration $a_{jlmt}$ after the jerk limitation at following brake limitation start timing occurs.

As described above in detail, when the current state is the brake feedback use state in the power train feedback control process according to the embodiment of the present invention, the calculation of the power train feedback torque $T_{fb\text{-}PT}$ using the PID control model is stopped, and the power train feedback torque $T_{fb\text{-}PT}$ output at the previous brake limitation release timing (where, at the timing to switch to the feedback limitation state) is stored as the output value from the power train feedback control unit 29.

At the brake limitation start timing, the power train feedback torque $T_{fb\text{-}PT\text{-}0K}$ obtained in the brake feedback use state or the brake feedback limitation state is output as the output value from the power train feedback control unit 29. The calculation of the power train feedback torque $T_{fb\text{-}PT}$ is restarted using the initial value of the power train feedback torque $T_{fb\text{-}PT\text{-}0K}$ based on the PID control model.

The power train mechanism 5 immediately after the brake limitation start timing generates the regulation torque which is set to a value of less than the estimated output possible torque $T_{min}$.

Next, a description will now be given of the brake feedback control process where the cruise assist ECU 20 acts as the brake feedback control unit 32.

Figure 8:
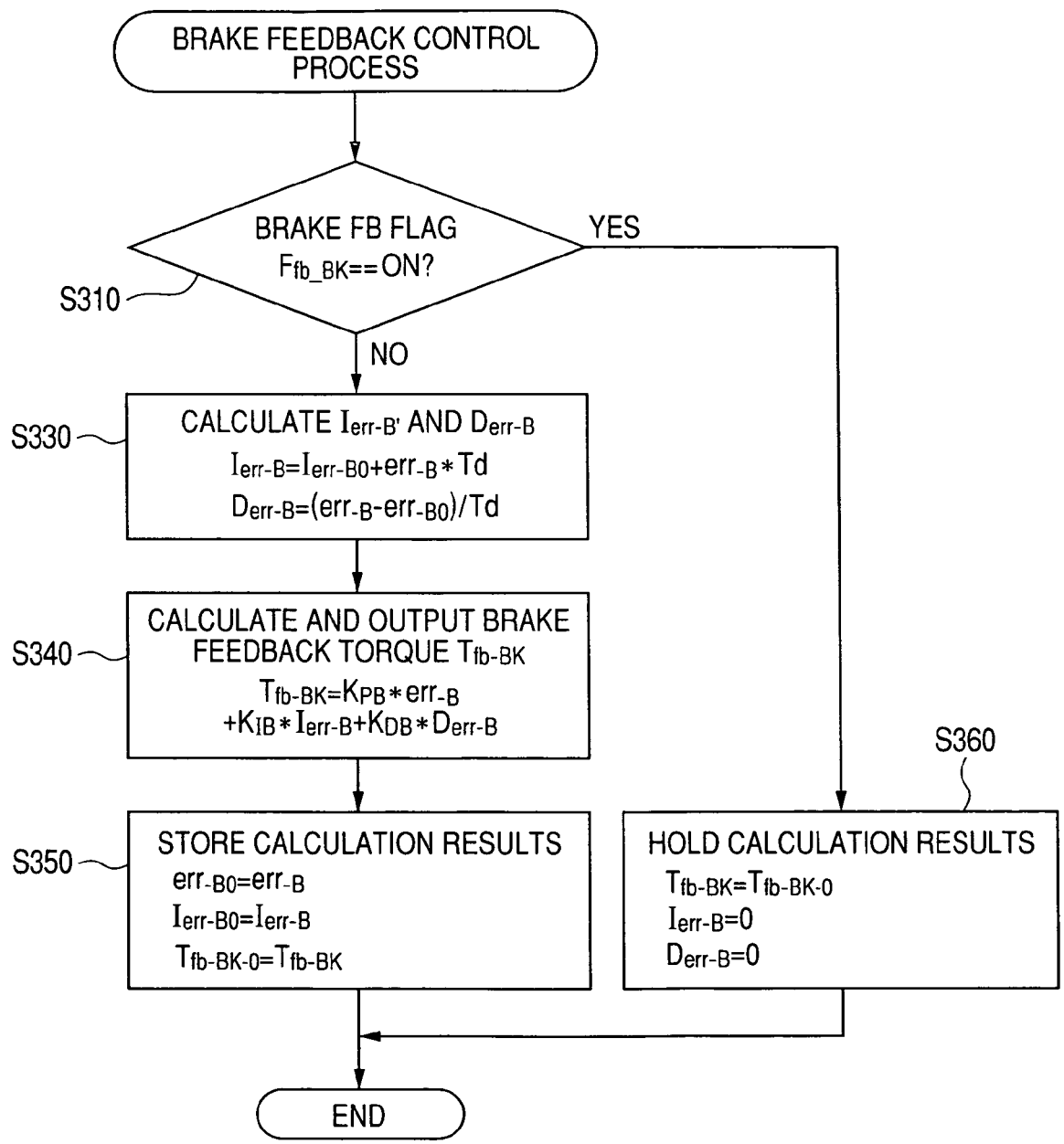
FIG. 8 is an explanatory diagram showing a brake feedback control process performed by a brake feedback control unit in the driver support system having the vehicle control device according to the embodiment of the present invention.

FIG. 8 is an explanatory diagram showing the brake feedback control process performed by the brake feedback control unit 32 in the driver support system having the vehicle control device according to the embodiment of the present invention.

The brake feedback control process is repeatedly executed every set timing. When the brake feedback control process is started, it is detected whether or not the brake feedback flag $F_{fb\text{-}BK}$ is ON state (High level) in step S310.

When the detection result indicates that the brake feedback flag $F_{fb\text{-}BK}$ is OFF state (Low level), it is detected that the current state is the brake feedback use state, and the operation flow progresses to step S330.

In step S330, the differential value $I_{err\text{-}B}$ and the integral value $D_{err\text{-}B}$ of the brake acceleration deviation $err_{\text{-}B}$ in the brake feedback control process currently executed.

Hereinafter, the cycle of the brake feedback control process currently executed is referred to as the "current cycle", and the cycle of the brake feedback control process previously executed is referred to as the "previous cycle".

In the embodiment, the differential value $I_{err\text{-}B}$ of the current cycle is obtained by adding a value to the differential value $I_{err\text{-}B0}$ (namely, Differential value $I_{err\text{-}B}$=Differential value $I_{err\text{-}B0}$+Brake acceleration deviation $err_{\text{-}B}\times$Set period Td) calculated in step S330 in the previous cycle, where the value is obtained by multiplying the brake acceleration deviation $err_{\text{-}B}$ calculated by the brake deviation calculation unit 31 in the current cycle by the set period Td.

Further, the integral value $D_{err\text{-}B}$ of the current cycle is obtained by dividing a value with the set period Td, (namely, Integral value $D_{err\text{-}B}$=(Brake acceleration deviation $err_{\text{-}B0}$−Brake acceleration deviation $err_{\text{-}B0}$)/Set period Td), where the value is obtained by subtracting the brake acceleration deviation $err_{\text{-}B}$ calculated by the brake deviation calculation unit 31 in the current cycle from the brake acceleration deviation $err_{\text{-}B0}$ calculated by the brake deviation calculation unit 31 in the previous cycle. The reference character "B0" in $err_{\text{-}B0}$ indicates the previous cycle.

In step S340, the brake feedback torque $T_{fb\text{-}BK}$ of the current cycle is calculated and then output.

Specifically, in the embodiment, the sum of the proportional term, the differential term, and the integral term is calculated as the brake feedback torque $T_{fb\text{-}BK}$ of the current cycle.

The proportional term is obtained by multiplying the brake acceleration deviation err-B calculated in the current cycle by the brake deviation calculation unit 31 with the proportional gain $K_{PB}$ that is set in advance (namely, Proportional term=Brake acceleration deviation $err_{\text{-}B}\times$Proportional gain $K_{PB}$).

The differential term is calculated by multiplying the differential value $I_{err\text{-}B}$ of the current cycle with the differential gain $K_{IB}$ that is set in advance (namely, Differential term=Differential value $I_{err\text{-}B}\times$Differential gain $K_{IB}$).

The integral term is calculated by multiplying the integral value $D_{err\text{-}B}$ of the current cycle with the integral gain $K_{DB}$ that is set in advance (namely, Integral term=Integral value $D_{err\text{-}B}\times$Integral gain $K_{DB}$).

In step S350, the brake acceleration deviation err-B calculated by the brake deviation calculation unit 31 in the current cycle, the differential value $I_{err\text{-}B}$ calculated in step S330 in the current cycle, and the brake feedback torque $T_{fb\text{-}BK}$ of the current cycle calculated in step S340 are stored.

That is, the brake acceleration deviation $err_{\text{-}B}$, the differential value $I_{err\text{-}B}$, and the brake feedback torque $T_{fb\text{-}BK}$ are stored as those of the previous processing cycle before a next brake feedback control process is executed.

The brake feedback control process of the current cycle is then completed.

That is, the brake feedback torque control process in the embodiment calculates and outputs the brake feedback torque $T_{fb\text{-}\#BK}$ using the PID model when the current state is the brake feedback use state.

When the detection result in step S310 indicates that the brake feedback flag $F_{fb\text{-}BK}$ is High level, it is detected that the current state is the brake feedback limitation state or the feedback limitation state, and the operation flow progresses to step S360.

In step S360, the brake feedback torque $T_{fb\text{-}BK\text{-}0}$ stored in previously executed step S350 is output as the brake feedback torque $T_{fb\text{-}BK}$ of the current cycle. In addition, this brake feedback torque $T_{fb\text{-}BK}$ of this current cycle is stored as the brake feedback torque $T_{fb\text{-}BK\text{-}0k}$ of the previous cycle for the next brake feedback control process. (hereinafter, the reference character "-0k" is added for indicating the brake feedback torque output in step S360.)

Because the brake feedback use state is switched to the brake feedback limitation state when the power train request torque $T_{wPT}$ (only as the brake torque) is less than the estimated output possible torque $T_{min}$, the brake request torque $T_{wBK}$ to be input to the brake ECU 16 ordinarily becomes 0 [N·m] when the process shown in step S360 is executed.

This means that the brake control amount calculation unit 33 is designed to obtain the brake request torque $T_{wBK}$ based on the brake feedback torque $T_{fb\text{-}BK}$ and the feedforward torque $T_{ff}$ so that the brake mechanism 10 generates the brake torque when the driver's vehicle is decelerated, and the brake mechanism 10 generates the torque of 0 [N·m] when the driver's vehicle runs at a constant speed.

The differential term and the integral term in the brake feedback torque $T_{fb\text{-}BK}$ are initialized, for example, set to zero.

This means preventing the brake feedback torque $T_{fb\text{-}BK}$ from being larger than the drive torque or the brake torque to achieve the target acceleration $a_{jlmt}$ after the jerk limitation in the following brake limitation release timing.

As described above, in the brake feedback control process of the embodiment, the operation to calculate the brake feedback torque $T_{fb\text{-}BK}$ using the PID model is halted when the current state is the brake feedback limitation state (or the feedback limitation state), and the brake feedback torque $T_{fb\text{-}BK}$ output at the brake limitation start timing (or at the timing to shift the feedback limitation state when the current state is the feedback limitation state) is stored as the output value from the brake feedback control unit 32.

In the brake limitation release timing, the brake feedback torque $T_{fb\text{-}BK\text{-}0k}$ output when the current state is in the brake feedback limitation state or the feedback limitation state is supplied as the output from the brake feedback control unit 32. In addition, the calculation of the brake feedback torque $T_{fb\text{-}BK}$ using the PID control model is restarted using the above brake feedback torque $T_{f\text{-}BK\text{-}0k}$ as the initial value.

It is thereby possible for the brake mechanism 10 immediately after the brake limitation release timing to generate a special brake torque that is larger than 0 [N·m].

<Example Operation>

Next, a description will now be given of an example operation of the cruise assist ECU 20 according to the embodiment of the present invention.

Figure 9:
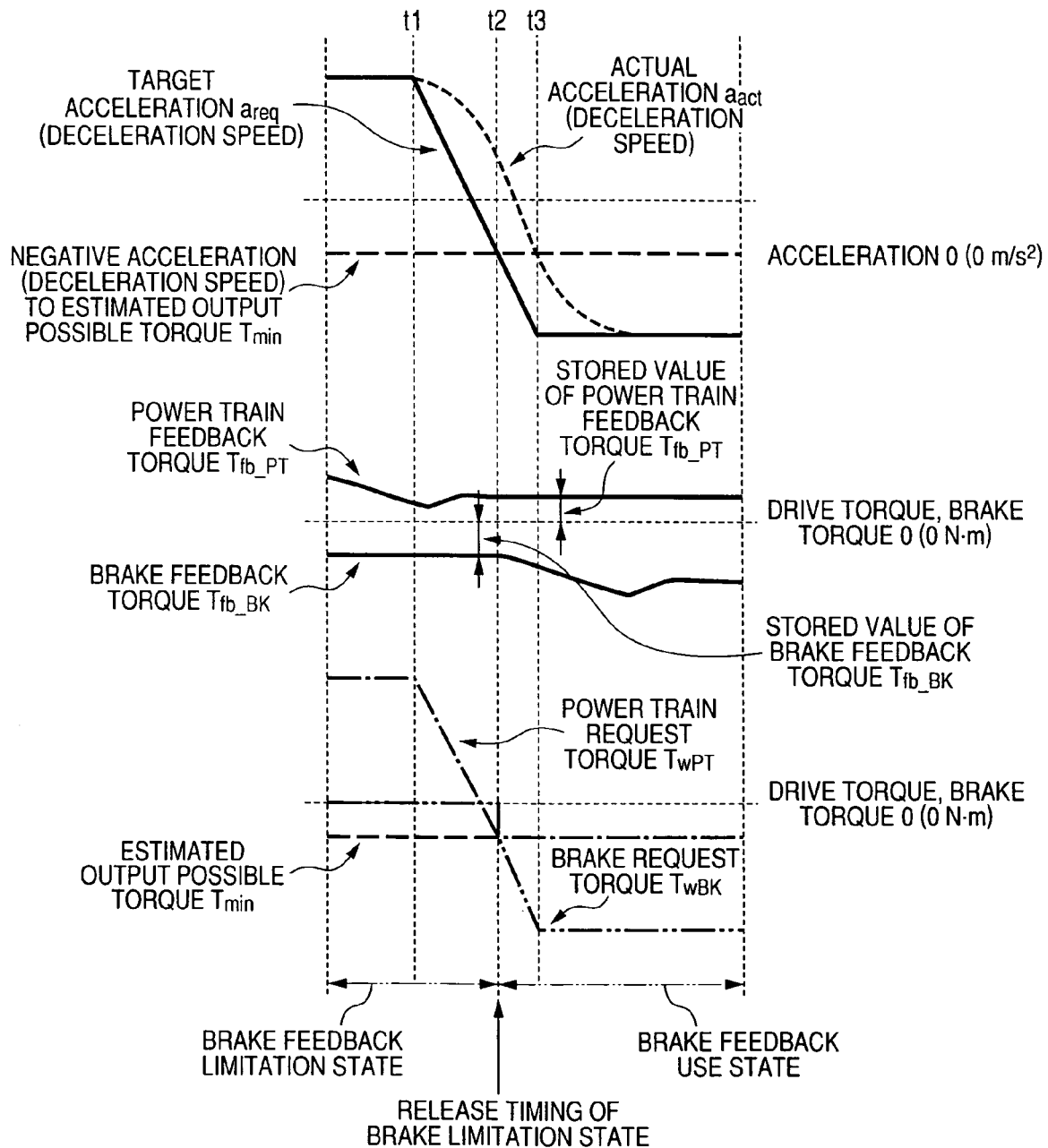
FIG. 9 is a timing chart showing an example of the operation of the cruise assist ECU having the vehicle control device according to the embodiment of the present invention.
Figure 10:
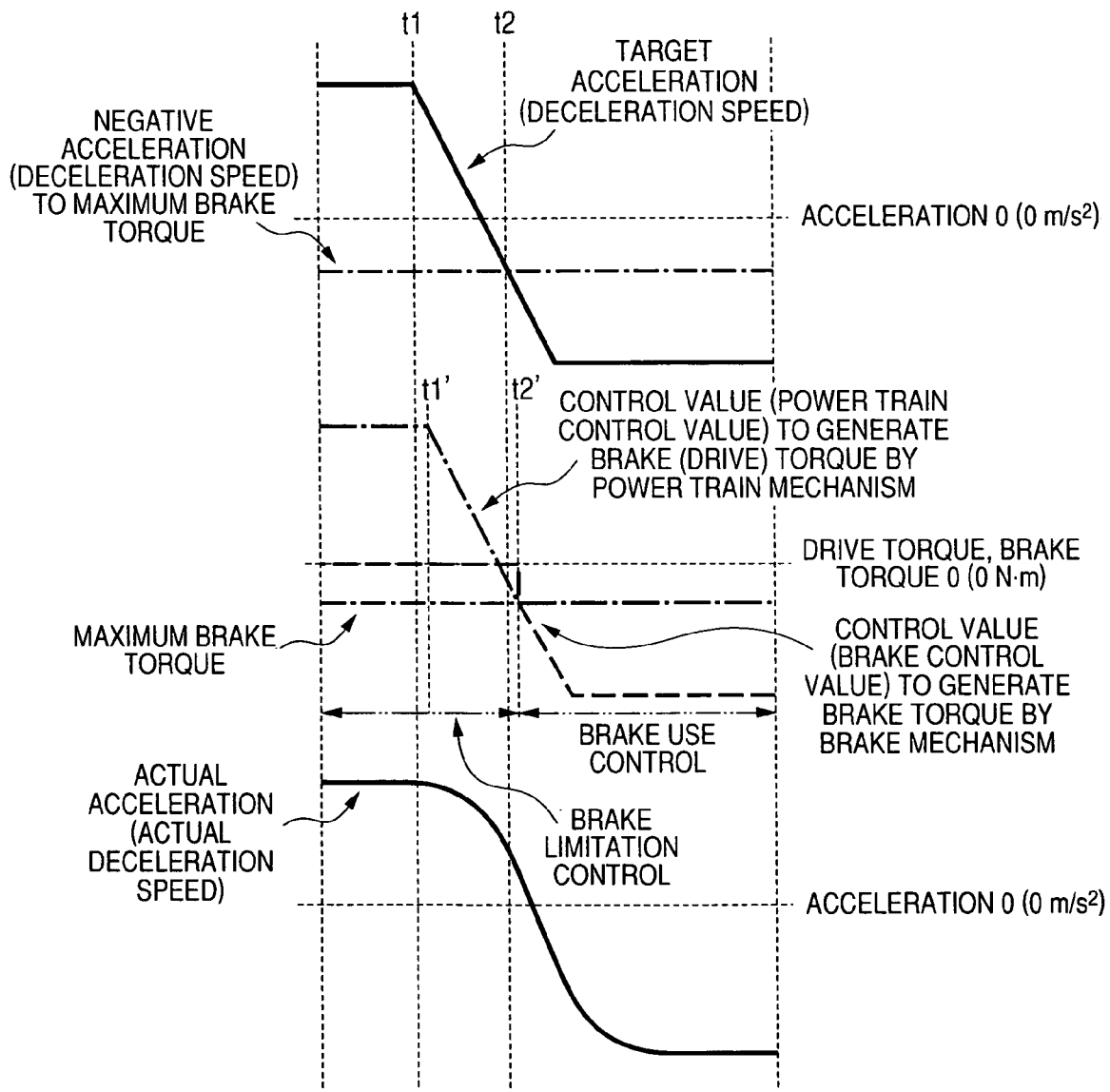
FIG. 10 is a timing chart showing an example of the control state of the vehicle control device according to the embodiment of the present invention.
Figure 11:
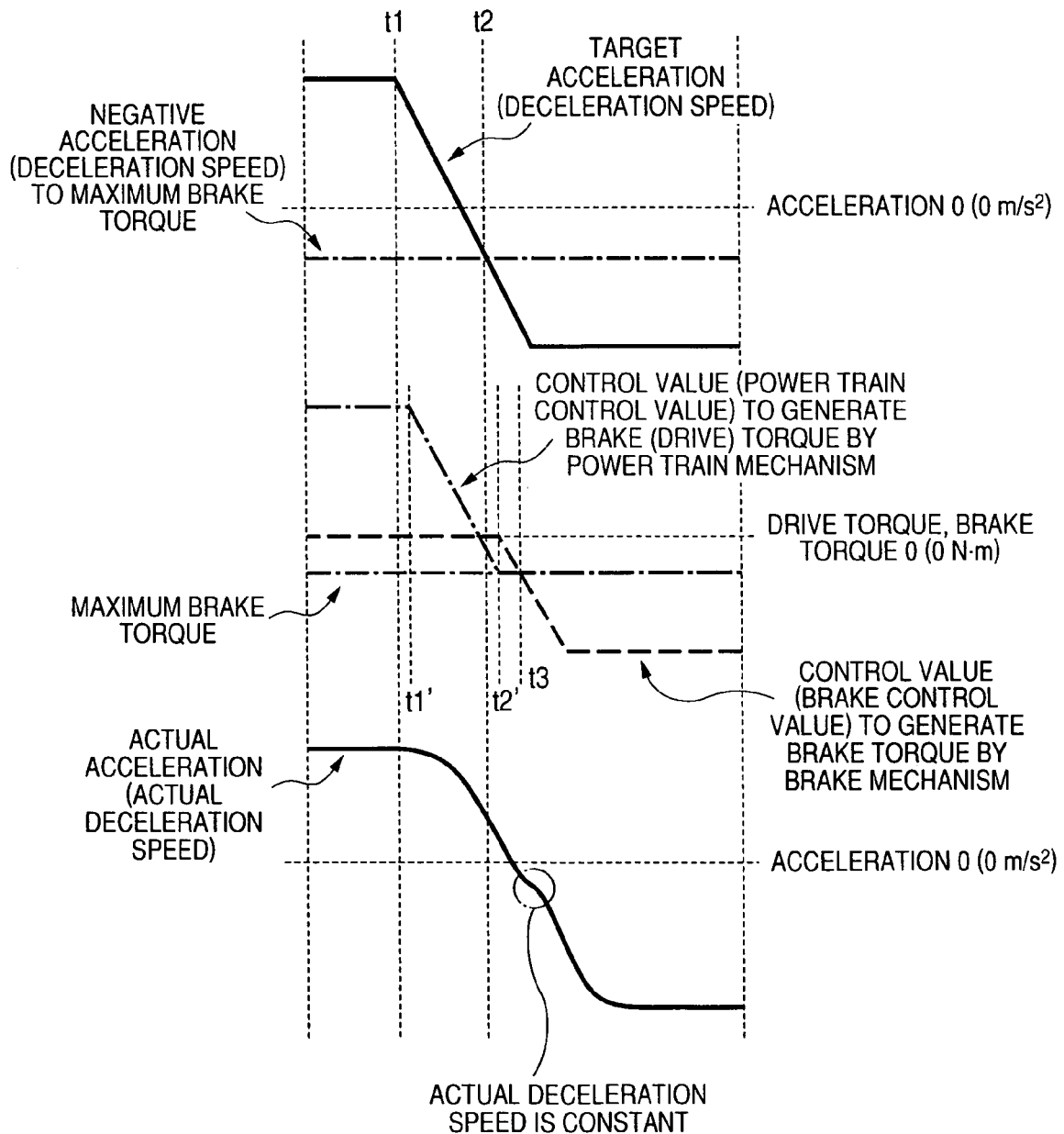
FIG. 11 is a timing chart showing a control operation performed by a conventional vehicle control device.

FIG. 9 is a timing chart showing an example of the operation of the cruise assist ECU 20 having the vehicle control device according to the embodiment of the present invention.

In the example shown in FIG. 9, the target acceleration $a_{req}$ calculated by the target acceleration calculating unit 21 is started to decrease at timing t1, and becomes equal to a negative acceleration (deceleration) that can be achieved by the estimated output possible torque $T_{min}$. The target acceleration $a_{req}$ finally becomes a constant value at timing t3.

In the above example, the acceleration control unit 22 selects the brake feedback limitation state because the brake torque necessary to achieve the target acceleration $a_{req}$ can be generated by the power train mechanism 5.

The brake feedback control unit 32 stops the calculation of the brake feedback torque $T_{fb\text{-}BK}$ using the PID model, and stores the brake feedback torque $T_{fb\text{-}BK}$ obtained at the brake limitation start timing as an output value. At the same time, the power train feedback control unit 29 calculates and outputs the power train feedback torque $T_{fb\text{-}PT}$ using the PID model so that the actual acceleration $a_{act}$ becomes equal to the target acceleration $a_{req}$ (in more detail, to the target acceleration $a_{jlmt}$ after the jerk limitation).

The brake feedback torque $T_{fb\text{-}BK}$, the power train feedback torque $T_{fb\text{-}PT}$, and the brake request torque $T_{wBK}$ and the power train request torque $T_{wPT}$ that are calculated based on the feedforward torque $T_{ff}$ are output to the 20 brake ECU 16 and the power train ECU 17.

The brake torque generated by the power train mechanism 5 is increased until the brake torque reaches the estimated output possible torque $T_{min}$.

In the brake feedback limitation state, the brake torque generated by the brake mechanism 10 is maintained to 0 [N·m] based on the feedforward torque $T_{ff}$.

When the power train request torque $T_{wPT}$ exceeds the estimated output possible torque $T_{min}$ at timing t2 (where, both the torques are the brake torques), the current state enters the brake feedback limitation release timing.

At this timing, the power train feedback control unit 29 stores as the output value the power train feedback torque $T_{fb\text{-}PT}$ which is continuously output from the brake limitation start timing, and the brake feedback control unit 32 supplies as the output value the brake feedback torque $T_{fb\text{-}BK}$ that is output at the brake limitation release timing without changing.

The power train feedback control unit 29 outputs the above values to the brake ECU 16 and the power train ECU 17, where the above values are the brake feedback torque $T_{fb\text{-}BK}$ and the power train feedback torque $T_{fb\text{-}PT}$, and the brake request torque $T_{wBK}$ and the power train request torque $T_{wPT}$ calculated based on the feedforward torque $T_{ff}$.

The brake torque generated by the brake mechanism 10 has a large value rather than 0 [N·m] immediately after the brake limitation release timing. That is, the brake torque is increased until the actual acceleration $a_{act}$ reaches the target acceleration $a_{req}$.

In the brake feedback use state, the power train mechanism 5 can be maintained at the estimated output possible torque $T_{min}$ by the feed forward torque $T_{ff}$, for example.

[Effects of the Embodiment]

As described above in detail, the acceleration control unit 22 controls the brake mechanism 10 to generate the brake torque of more than 0 [N·m] immediately after the brake limitation release timing. It is therefore possible to decrease the time period necessary to affect the brake torque generated by the brake mechanism 10 to the driver's vehicle at the time to switch to the brake feedback use state from the brake feedback limitation state, when compared with the conventional devices.

According to the cruise assist electric control device 20 of the embodiment, it is possible to enhance the function to follow the target acceleration $a_{req}$ in the brake limitation release timing, that is, to decrease the response delay of the actual acceleration $a_{act}$ to the target acceleration.

Further, according to the acceleration control unit 22 of the embodiment, it is possible to smoothly switch the brake torque generated by the power train mechanism 5 to the brake torque generated by the brake mechanism 10.

As a result, it is possible to enhance driving comfort for the driver and passengers when the driver's vehicle is accelerated because the power train mechanism 5 generates the estimated output possible torque $T_{min}$ at the brake limitation start timing.

[Other Embodiments]

The scope of the present invention is not limited by the above embodiment. The concept of the present invention can be applied to various applications. For example, in the brake feedback control process controlled by the brake feedback control unit 32 according to the above embodiment, the brake feedback torque $T_{fb\text{-}BK}$, which is output in the brake feedback limitation state, is output immediately after the brake limitation release timing. The present invention is not limited by the embodiment. For example, it is possible to use any output value unless the brake mechanism 10 can generate a brake torque of more than 0 [N·m] immediately after the brake limitation release timing.

In the power train feedback control process controlled by the power train feedback control unit 29 according to the embodiment, the power train feedback torque $T_{fb\text{-}PT}$, which is output in the brake feedback use state, is output immediately after the brake limitation start timing. The present invention is not limited by the embodiment. For example, it is possible to use any output value unless the power train mechanism 5 can generate a brake torque of less than the estimated output possible torque $T_{min}$ (namely, the maximum brake torque) immediately after the brake limitation start timing.

By the way, in the brake feedback control process controlled by the brake feedback control unit 32 according to the embodiment, the brake feedback torque $T_{fb\text{-}BK}$ is calculated based on the PID control (namely, using the PID control model) in the brake use state. The present invention is not limited by the embodiment. For example, it is possible to calculate the brake feedback torque $T_{fb\text{-}BK}$ only based on the PI control (namely, only using the PI control model) or to calculate it based only on the proportional control.

In the power train feedback control process, like the brake feedback control process, it is possible to calculate the power train feedback torque $T_{fb\text{-}PT}$ only based on the PI control (namely, only using the PI control model), or to calculate it based only on the proportional control.

Although the execution of the application program generates the function of the acceleration control unit 22 in the embodiment, it is possible to realize this function by combining electrical circuits as hardware.

When the acceleration control unit 22 is realized by using the hardware, namely, electrical circuits, it is also possible to form the acceleration control unit 22 separating from the cruise assist ECU 20.

Although the above embodiment according to the present invention shows that the brake ECU 16 controls the hydraulic (or oil pressure) brake. The present invention is not limited by the embodiment. It is possible for the brake ECU 16 control a regeneration brake. That is, the brake ECU 16 can control any mechanism unless generating the brake torque according to the brake request torque $T_{wBK}$ transferred from the cruise assist ECU 20.

Further, although the power train ECU 17 controls the operation of the gasoline engine as the internal combustion engine 6 in the embodiment, it is possible to construct that the power train ECU 17 control other engines, for example, a diesel engine.

Still further, the power train ECU 17 controls the operation of the transmission mechanism 7 comprised of a known planetary gear automatic transmission. The present invention is not limited by the embodiment. For example, it is possible to use a known manual transmission device, a continuously variable transmission (CVT), or a semiautomatic transmission device (for example, dual clutch transmission (DCT)). That is, it is possible to use various types of the internal combustion engine 6 and the transmission mechanism 7 unless they generate a drive torque or a brake torque according to the magnitude of the power train request torque $T_{wPT}$.

In the embodiment, the peripheral monitoring device 15 is a millimeter wave radar device of a FMCW type. The present invention is not limited by the embodiment. For example, it is possible to use a on-vehicle camera placed to detect objects existing in a front direction of the driver's vehicle, or a laser radar device to transmit a laser light and receive a reflected laser light in order to detect objects existing in a front direction of the driver's vehicle, or a combination of the on-vehicle camera and the laser radar device (such as a millimeter wave radar device, on-vehicle camera, and a laser radar device).

[Relationship Between Claims and Embodiment]

The target acceleration calculating unit 21 corresponds to a target value calculation means. The function for the cruise assist ECU 20 to obtain an actual acceleration $a_{act}$ from the acceleration sensor 42 corresponds to an acceleration obtaining means.

The power train deviation calculating unit 28, the power train feedback control unit 29, the power train control amount calculating unit 30, and the feedforward control unit 35 in the acceleration control unit 22 correspond to a power train control means.

The brake deviation calculation unit 31, the brake feedback control unit 32, the brake control amount calculation unit 33, and the feedforward control unit 35 in the acceleration control unit 22 correspond to a brake control means.

Further, the feedback amount limitation control unit 38 in the embodiment corresponds to a state detection and switching means.

The brake feedback control process executed at the brake limitation release timing in the embodiment corresponds to a first switching means.

The power train feedback control process executed at the brake limitation start timing in the embodiment corresponds to a second switching means. The process in step S360 in the embodiment corresponds to the brake control value storage means, and the process shown in step S260 in the power train feedback control process according to the embodiment corresponds to a power train control value storage means.

(Other Features and Effects of the Present Invention)

In accordance with another aspect of the present invention, the vehicle control device further has a brake control value storage means capable of outputting the predetermined control value of not less than 0 [N·m] as an initial value. That is, the brake control value storage means stores the brake control value as the predetermined control value to be output from the brake control means at a next switching time to switch from the brake limitation control to the brake use control, where the brake control value to be stored is calculated by the brake control means at a timing when the state detection and switching means switches from the brake use control to the brake limitation control.

That is, it is acceptable to use the brake control value that is output from the brake control means at the previous switching time of switch from the brake use control to the brake limitation control, as the predetermined control value that is output as an initial value from the brake control means to the brake mechanism.

In accordance with another aspect of the present invention, the vehicle control device further has a second switching time control means that controls the power train control means to output a predetermined control value, with which a predetermined regulative torque of less than the maximum brake torque is generated, to the power train mechanism as an initial value of the power train control value when the state detection and switching means switches from the brake use control to the brake limitation control.

Because the vehicle control device having the above structure can instruct the power train mechanism to generate the regulative torque immediately after the brake use control is switched to the brake limitation control, it is possible to decrease the time delay of the actual acceleration of the driver's vehicle to the target acceleration when the driver's vehicle is accelerated. As a result, the vehicle equipped with the vehicle control device according to the present invention can provide the driving comfort to the vehicle driver and passengers.

In accordance with another aspect of the present invention, the vehicle control device further has a power train control value storage means in order that the power train control means outputs the regulative control value, as an initial value, with which the regulative torque is generated. That is, the vehicle control device further has the power train control value storage means that stores a power train control value, calculated by the power train control means when the state detection and switching means switches from the brake limitation control to the brake use control, as a regulative control value to be output from the power train control means at a next switching timing of switching to the brake limitation control from the brake use control.

It is acceptable to use the power train control value, which is output at the previous switching timing of switching to the brake limitation control from the brake use control, as the regulative control value to be output from the power train control means to the power train mechanism.

In the vehicle control device as another aspect of the present invention, the power train control means and the brake control means calculate values, as the power train control value and the brake control value, respectively, based on a proportional value of a deviation between the target acceleration calculated by the target value calculation means and the actual acceleration obtained by the acceleration obtaining means.

It is acceptable for each of the power train control means and the brake control means to execute at least the proportional control.

Further, it is possible for each of the power train control means and the brake control means to calculates, as the power train control value and the brake control value, respectively, at least one of an integral term and a differential term, where the integral term is a value in proportion to a time integral of a deviation (hereinafter, referred to as the "acceleration deviation") between the target acceleration and the actual acceleration of the driver's vehicle, and the differential term is a value in proportion to a time differential of the acceleration deviation.

That is, it is possible to construct the power train control means and the brake control means so that each of the power train control means and the brake control means executes the PID control based on the proportional control, the integral control, the differential control, or a combination of those controls.

When each of the power train control means and the brake control means in the vehicle control device executes the PID control, it is necessary for those storage means to have the function to initialize the integral term and the differential term in the brake control value and the power train control value (namely, to set those terms to zero and to store the initialized terms).

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A vehicle control device to be mounted to a vehicle comprised of a power train mechanism and a brake mechanism, the power train mechanism being capable of generating a drive torque or a brake torque according to a power train control value transferred from the vehicle control device and the brake mechanism being capable of generating a brake torque according to a brake control value transferred from the vehicle control device, the vehicle control device comprising:
a target value calculation means that repeatedly calculates a target acceleration according to a running condition of the driver's vehicle;
an acceleration obtaining means that obtains an acceleration applied to the driver's vehicle;
a power train control means that calculates the power train control value so that the acceleration obtained by the acceleration obtaining means reaches the target acceleration calculated by the target value calculation means, and outputs the power train control value to the power train mechanism;
a brake control means that calculates the brake control value so that the acceleration obtained by the acceleration obtaining means reaches the target acceleration calculated by the target value calculation means;
a state detection and switching means that executes a brake limitation control to halt a transmission of the brake control value from the brake control means to the brake mechanism when an output request torque as a drive torque or a brake torque to be generated by the power train mechanism according to the power train control value calculated by the power train control means, is the brake torque being less than a maximum brake torque, or the drive torque; and executes a brake use control to allow the output of the brake control value from the brake control means to the brake control mechanism when the output request torque is the brake torque of not less than the maximum brake torque; and
a first switching time control means that controls the brake control means to output a predetermined control value, with which a predetermined brake torque of more than zero is generated, to the brake mechanism as an initial value of the brake control value when the state detection and switching means switches from the brake limitation control to the brake use control.

2. The vehicle control device according to claim 1, further comprising a brake control value storage means that stores the brake control value, calculated by the brake control means at a timing when the state detection and switching means switches from the brake use control to the brake limitation control, as the predetermined control value to be output from the brake control means at a next time to switch from the brake limitation control to the brake use control.

3. The vehicle control device according to claim 1, further comprising a second switching time control means that controls the power train control means to output a predetermined control value, with which a predetermined regulative torque of less than the maximum brake torque is generated, to the power train mechanism as an initial value of the power train control value when the state detection and switching means switches from the brake use control to the brake limitation control.

4. The vehicle control device according to claim 2, further comprising a second switching time control means that controls the power train control means to output a predetermined control value, with which a predetermined regulative torque of less than the maximum brake torque is generated, to the power train mechanism as an initial value of the power train control value when the state detection and switching means switches from the brake use control to the brake limitation control.

5. The vehicle control device according to claim 3, further comprising a power train control value storage means that stores a power train control value calculated by the power train control means when the state detection and switching means switches from the brake limitation control to the brake use control as a regulative control value to be output from the power train control means at a next switching from the brake use control to the brake limitation control.

6. The vehicle control device according to claim 4, further comprising a power train control value storage means that stores a power train control value calculated by the power train control means when the state detection and switching means switches from the brake limitation control to the brake use control as a regulative control value to be output from the power train control means at a next switching from the brake use control to the brake limitation control.

7. The vehicle control device according to claim 1, wherein the power train control means and the brake control means calculate values, as the power train control value and the brake control value, respectively, based on a proportional value of a deviation between the target acceleration calculated by the target value calculation means and the acceleration obtained by the acceleration obtaining means.

8. The vehicle control device according to claim 2, wherein the power train control means and the brake control means calculate values, as the power train control value and the brake control value, respectively, based on a proportional value of a deviation between the target acceleration calculated by the target value calculation means and the acceleration obtained by the acceleration obtaining means.

9. The vehicle control device according to claim 3, wherein the power train control means and the brake control means calculate values, as the power train control value and the brake control value, respectively, based on a proportional value of a deviation between the target acceleration calculated by the target value calculation means and the acceleration obtained by the acceleration obtaining means.

10. The vehicle control device according to claim 5, wherein the power train control means and the brake control means calculate values, as the power train control value and the brake control value, respectively, based on a proportional value of a deviation between the target acceleration calculated by the target value calculation means and the acceleration obtained by the acceleration obtaining means.

* * * * *